United States Patent
Bonnesen et al.

(10) Patent No.: US 6,566,561 B1
(45) Date of Patent: May 20, 2003

(54) FLUORO-ALCOHOL PHASE MODIFIERS AND PROCESS FOR CESIUM SOLVENT EXTRACTION

(75) Inventors: Peter V. Bonnesen, Knoxville, TN (US); Bruce A. Moyer, Oak Ridge, TN (US); Richard A. Sachleben, Westford, MA (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 09/703,899

(22) Filed: Nov. 2, 2000

Related U.S. Application Data

(63) Continuation-in-part of application No. 09/146,800, filed on Sep. 3, 1998, now Pat. No. 6,174,503.

(51) Int. Cl.$^7$ .......................... C07C 31/38; C22B 26/10; C02F 1/26
(52) U.S. Cl. ................ 568/812; 570/127; 423/181; 423/182; 210/634; 210/681; 568/842
(58) Field of Search .................. 423/8, 9, 181, 423/182; 210/681, 682, 634, 638; 566/255; 549/350; 568/812, 842; 570/127

(56) References Cited

U.S. PATENT DOCUMENTS

| | | |
|---|---|---|
| 5,607,591 A | 3/1997 | Dozol et al. |
| 5,888,398 A | 3/1999 | Dietz et al. |
| 5,926,687 A | 7/1999 | Dozol et al. |
| 6,040,462 A | 3/2000 | Oh et al. |

OTHER PUBLICATIONS

P.V. Bonnesen, et al., Alkaline–Side Extraction of Cesium from Savannah River Tank Waste Using a Calixarene–Crown Ether Extractant, Report ORNL/TM–13704, ORNL, Oak Ridge, TN, 1998.

P.V. Bonnesen, et al., Dev. of Process Chemistry for the Removal of Cesium from Acidic Nuclear Waste by Calix[4]arene–crown–6 Ethers, Ch.3, G.J. Lumetta,et al., ACS Symposium 757,Wash DC, 2000.

L.H. Delmau, et al., Improved Performances of the Alkaline–Side CSEX Process for Cesium Extraction from Alkaline High–Level Waste Obtained by Characterization of the Effect of Surfactant Impurities, Rpt ORNL/TM–1999/209, ORNL, Oak Ridge, TN, 1999.

O.J. Nielsen, et al., Ultraviolet Absorption Spectrum Kinetics and Mechanism of the Self–Reaction of CHF2CF2O2 Radicals in the Gas Phase at 298 K, J. Phys. Chem. 1992, 10875–10879.

B.A. Moyer, et al., Alkane–Insoluble Trialkylammonium Double Salts Involving the Dodecamolybdophosphate Anion. II. Effect of Amine Structure on Third–Phase Formation, pp 417–445, 1987.

P.V. Bonnesen, et al., A Robust Alkaline–side CSEX Solvent Suitable for Removing Cesium from Savannah River High Level Waste, Solvent Extr. Ion Exch., 2000, (18) (16), 1079–1108.

*Primary Examiner*—Sreeni Padmanabhan
(74) *Attorney, Agent, or Firm*—Emily G. Schneider; Paul A. Gottlieb

(57) ABSTRACT

The invention relates to a class of phenoxy fluoro-alcohols, their preparation, and their use as phase modifiers and solvating agents in a solvent composition for the extraction of cesium from alkaline solutions. These phenoxy fluoro-alcohols comply with the formula:

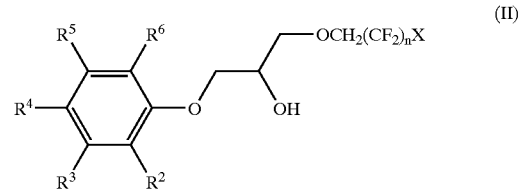

(II)

in which n=2 to 4; X represents a hydrogen or a fluorine atom, and $R^2$–$R^6$ are hydrogen or alkyl substituents. These phenoxy fluoro-alcohol phase modifiers are a necessary component to a robust solvent composition and process useful for the removal of radioactive cesium from alkaline nuclear waste streams. The fluoro-alcohols can also be used in solvents designed to extract other cesium from acidic or neutral solutions.

11 Claims, 13 Drawing Sheets

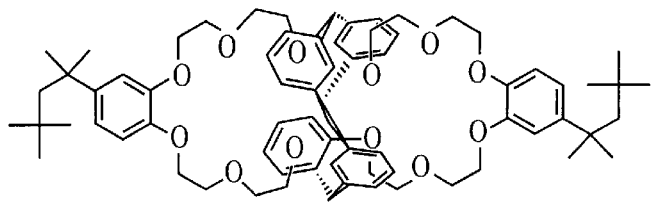
CALIX[4]ARENE-BIS-TERT-OCTYLBENZO-CROWN-6 ETHER ("BOBCALIX[4]CROWN6")
FIG. 1A
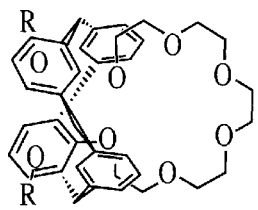 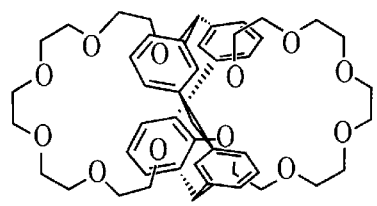
1 CALIX[4]ARENE CROWN-6 ETHER     2 CALIX[4]ARENE-BIS-CROWN-6 ETHER
FIG. 1B
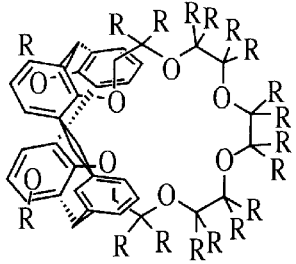 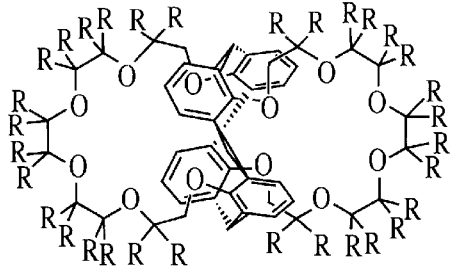
R = H, CH$_3$, ALKYL, CYCLOALKYL, OR ANY COMBINATION THEREOF
FIG. 1C CALIX[4]ARENE    X = Cl, Br, I, OTs, OMs, ETC.    1,3-ALT-CALIX[4]ARENE
                 (Ts : P-TOLUENESULFONYL)          BIS CROWN-6-ETHER
                 (Ms : METHANESULFONYL)

TYPE ONE:

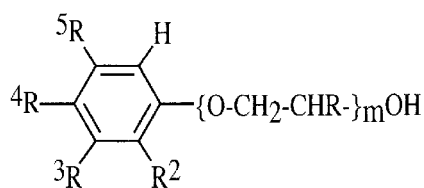

WHERE R = -H, -CH$_3$, -CH$_2$OCH$_3$, -CH$_2$OH, -CH$_2$OCH$_2$CF$_3$, OR -CH$_2$OCF$_2$CF$_2$H AND m = 1 OR 2, AND R$^2$, R$^3$, R$^4$, AND R$^5$ ARE ALKYL SUBSTITUENTS, WHERE THE SUM TOTAL OF CARBON ATOMS IS FROM 4 TO 16, WITH NO ONE GROUP LESS THAN TWO CARBONS.

TYPE TWO:

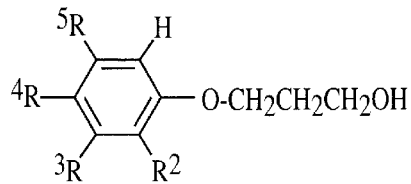

WHERE R$^2$, R$^3$, R$^4$, AND R$^5$ ARE ALKYL SUBSTITUENTS, WHERE THE SUM TOTAL OF CARBON ATOMS IS FROM 4 TO 16, WITH NO ONE GROUP LESS THAN TWO CARBONS.

FIG. 2

TYPE ONE:

| ENTRY | m | R¹ | R² | R³ | R⁴ | R⁵ |
|---|---|---|---|---|---|---|
| A | 1 | H | H | H | t-OCTYL | H |
| B | 1 | CH$_3$ | H | H | t-OCTYL | H |
| C | 1 | H | H | t-BUTYL | H | t-BUTYL |
| D | 1 | H | t-BUTYL | H | t-BUTYL | H |
| E | 1 | CH$_2$OCF$_2$CF$_2$H | H | H | t-OCTYL | H |

TYPE TWO:

| ENTRY | R² | R³ | R⁴ | R⁵ |
|---|---|---|---|---|
| F | H | t-BUTYL | H | t-BUTYL |
| G | H | H | t-OCTYL | H |

2-(4-t-OCTYLPHENOXY)-ETHANOL 1-(4-t-OCTYLPHENOXY)-2-PROPANOL 2-(3,5-DI-t-OCTYLPHENOXY)-ETHANOL 2-(2,4-DI-t-BUTYLPHENOXY)-ETHANOL 1-(1,1,2,2-TETRAFLUOROETHOXY),
3-(4-t-OCTYLPHENOXY)-2-PROPANOL 3-(3,5-DI-t-BUTYLPHENOXY)-1-PROPANOL 3-(4-t-OCTYLPHENOXY)-1-PROPANOL

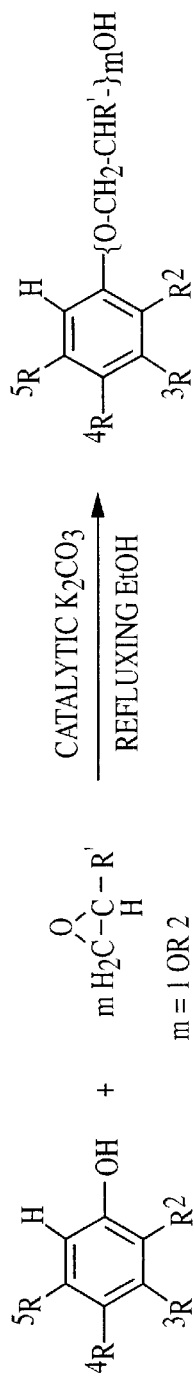
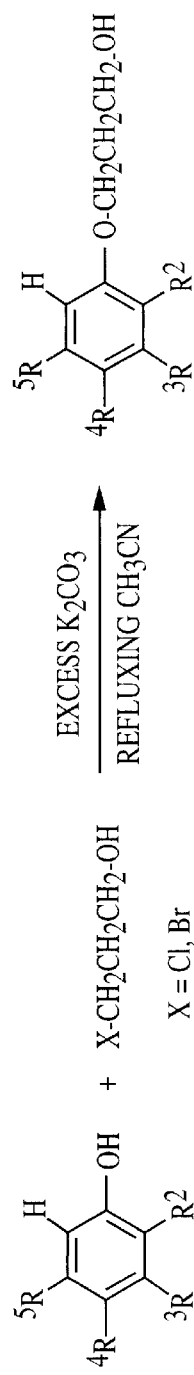
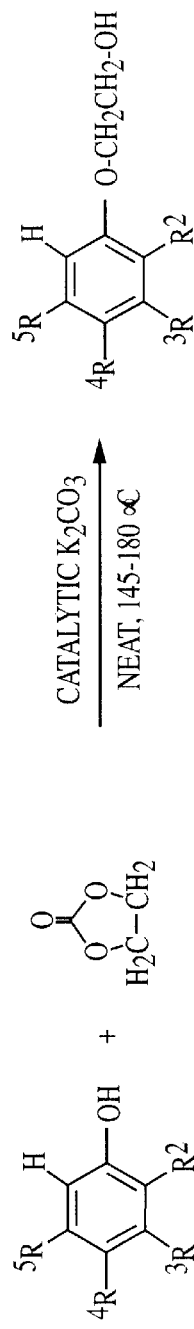
FIG. 5

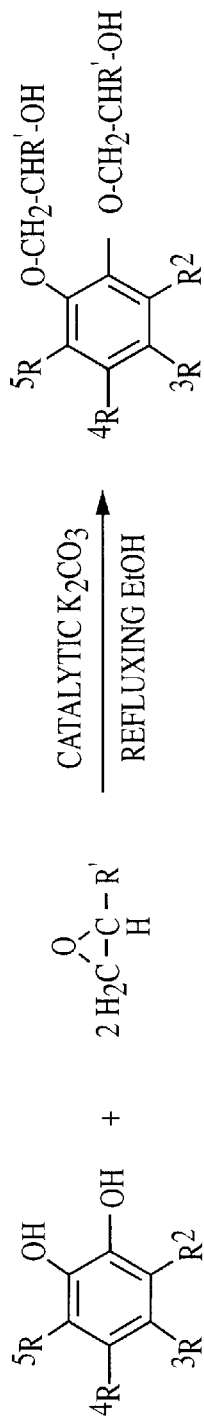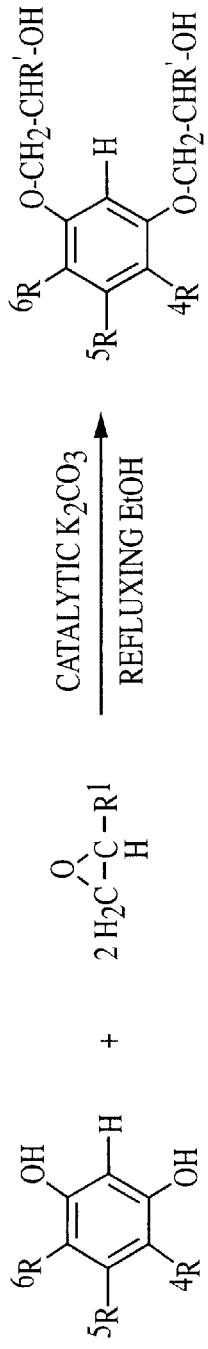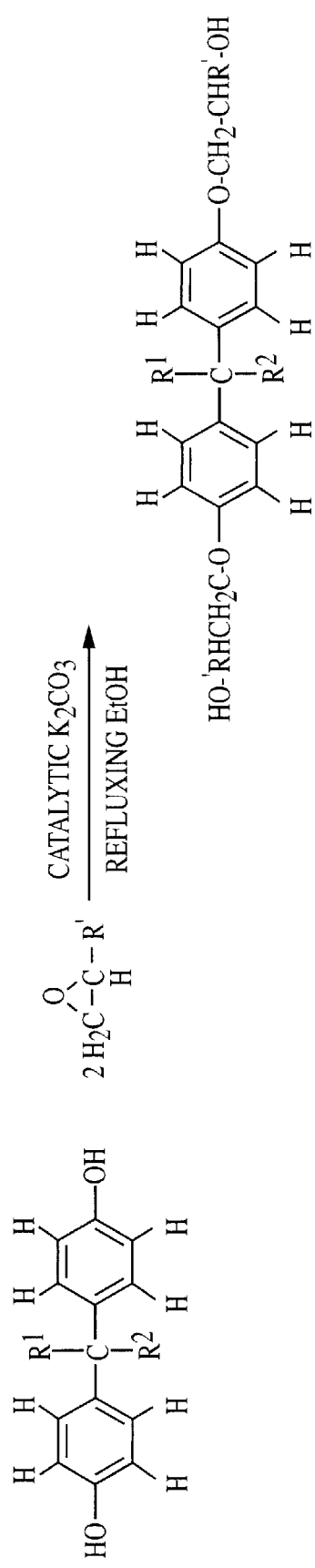
FIG. 6

TRITON® X-15

| MODIFIER NAME | MODIFIER STRUCTURE |
|---|---|
| 1-(2,2,3,3-TETRAFLUOROPROPOXY)-3-(4-TERT-OCTYLPHENOXY)-2-PROPANOL<br><br>CODE NAME: Cs-6 | 4-tert-octylphenyl glycidyl ether with OCH$_2$CF$_2$CF$_2$H and OH |
| 1-(2,2,3,3-TETRAFLUOROPROPOXY)-3-(4-TERT-BUTYLPHENOXY)-2-PROPANOL<br><br>CODE NAME: Cs-7TB | 4-tert-butylphenyl glycidyl ether with OCH$_2$CF$_2$CF$_2$H and OH |
| 1-(2,2,3,3-TETRAFLUOROPROPOXY)-3-(4-SEC-BUTYLPHENOXY)-2-PROPANOL<br><br>CODE NAME: Cs-7SBT AND Cs-7SB | 4-sec-butylphenyl glycidyl ether with OCH$_2$CF$_2$CF$_2$H and OH |
| 1-(2,2,3,3-TETRAFLUOROPROPOXY)-3-(4-TERT-AMYLPHENOXY)-2-PROPANOL<br><br>CODE NAME: Cs-7TA | 4-tert-amylphenyl glycidyl ether with OCH$_2$CF$_2$CF$_2$H and OH |

FIG. 12

FLUORO-ALCOHOL PHASE MODIFIERS AND PROCESS FOR CESIUM SOLVENT EXTRACTION

CROSS REFERENCE TO RELATED APPLICATION

The present Application is a continuation-in-part of U.S. patent application Ser. No. 09/146,800, filed Sep. 3, 1998 now U.S. Pat. No. 6,174,503, under notice of allowance, hereby incorporated in its entirety by reference.

STATEMENT AS TO RIGHTS TO INVENTIONS MADE UNDER FEDERALLY SPONSORED RESEARCH AND DEVELOPMENT

The U.S. Government has rights in this invention pursuant to Contract No. DE-AC05-00OR22725 awarded by the Department of Energy to UT-Battelle, LLC.

FIELD OF THE INVENTION

The present invention generally relates to a composition and process for extracting metals from liquids. More particularly, this invention relates to a class of phenoxy fluoro-alcohols, their preparation, and their use as phase modifiers and solvating agents in a solvent composition for the extraction of cesium from alkaline solutions.

BACKGROUND OF THE INVENTION

Many nuclear energy complexes and treatment sites have environmental problems where cesium removal is needed. Alkaline wastes containing radioactive Cesium-137, such as those stored at the Department of Energy's Hanford, Wash., Oak Ridge, Tenn., and Savannah River, S.C. sites are examples Among the technologies that are currently being investigated for cesium removal from alkaline nuclear waste are solid-phase sorbent methods, such as crystalline silicotitanate, and precipitation methods, such as addition of sodium tetraphenylborate to form insoluble cesium tetraphenylborate. While generally adequate, both crystalline silicotitanate and in-tank-precipitation using sodium tetraphenylborate possess certain disadvantages that prevent them from being completely satisfactory treatment technologies. As the concentration of radioactive cesium-137 that is sorbed onto a column of crystalline silicotitanate (CST) increases, the radiation and thermal heat generated produce changes in the sorption properties of the CST material leading to desorption of cesium. Flammable hydrogen gas has also been observed to evolve from CST columns that are loaded with radioactive cesium-137. Disadvantages in using sodium tetraphenylborate for in-tank precipitation include breakdown of the inherently unstable tetraphenylborate to liberate benzene, potentially at unexpected rates and places in the treatment process.

Liquid-liquid handling methods, such as solvent-extraction, on the other hand, can be designed and used in a manner to minimize chemical and radiolytic breakdown of the reagents involved in the separation process. The reagents used in solvent extraction can be designed to have high chemical and radiolytic stability, and use of contacting equipment such as centrifugal contactors can minimize the exposure time of the solvent to high radiation fields, thus extending the useful life of the solvent. Solvent extraction processes can contribute great flexibility in being able to treat large volumes of highly radioactive waste in a safe manner, decontaminate the waste to a high level, and enable the extracted cesium to be delivered to a suitable waste form such as vitrified glass. However, there are currently no practical, developed solvent extraction processes for the removal of cesium directly from the tanks with the waste in high-salt alkaline form that the Applicants are aware of; only acid-side extraction has been addressed as described in Dietz et al. U.S. Pat. No. 5,888,398, Mar. 30, 1999, and the use of acid-side solvent-extraction technology to treat the alkaline tanks would require acidification of the waste—a costly option. In addition, the selectivity for cesium over sodium for the process described in U.S. Pat. No. 5,888,398 is generally less than 100, making separation of cesium from waste solutions that are highly concentrated in sodium relative to cesium inefficient. The ratios of the sodium to cesium concentrations in alkaline wastes such as those stored at the Department of Energy's Hanford, Wash., Oak Ridge, Tenn., and Savannah River, S.C. sites are generally in excess of 10,000.

Accordingly, the present invention alleviates the necessity of adding acid or other substances to the waste since cesium extraction may be effected directly from the waste matrix. Also, the present invention is highly selective for cesium over sodium (selectivity generally greater than 10,000). As such, the present invention could play a key role in a grand treatment scheme for alkaline nuclear wastes, especially wastes with a high concentration of competing alkali metal cations.

A further problem to be solved is the need for a method which regenerates the extractant by utilizing a safe and cost-effective stripping procedure, and which avoids further generation of waste. Such methods should also release cesium from the extractant solvent without employing highly concentrated mineral acids, solvent evaporation, or distillation, or contacting of the solvent with cation exchangers. Thus, the present invention comprises a solvent extraction and stripping process cycle for the removal of cesium from alkaline tank waste. After the solvent is stripped of cesium, the solvent can be recycled in a continuous extraction and stripping process cycle.

Previously reported extractants have generally possessed insufficient selectivity or extraction power to remove cesium from a matrix concentrated in competing alkali metal cations. In addition, earlier extraction solvents involved difficulties with stability, stripping, or phase disengagement. Thus, no other candidate solvent system has emerged as a serious contender for the targeted application.

In U.S. patent application Ser. No. 09/146,800 filed Sep. 3, 1998 and hereby incorporated by reference, a solvent composition and process for extracting cesium from alkaline solutions, in particular alkaline nuclear waste solutions containing high concentrations of sodium nitrate, was described. The solvents described are composed of a calix [4]arene-crown ether extractant (most preferably calix[4] arene-bis-(tert-octylbenzo-crown-6) ether), an alkylaryl ether alcohol phase modifier, and a diluent. The calixarene-crown extractant complexes cesium cation ($Cs^+$), and extracts it into the solvent phase as an ion-pair with, an anion such as nitrate to balance the positive charge. The alkylaryl ether alcohol phase modifiers described were a class of alkylphenoxy alcohols designed to improve the cesium extraction strength, prevent third-phase formation, and provide good phase-coalescence behavior. It is desirable to have as potent a modifier as possible, so that high cesium distribution ratios can be obtained at low extractant concentrations (as the calixarene extractants are expensive). Of the modifiers listed and tested in U.S. patent application Ser. No. 09/146,800, 1-(1,1,2,2-tetrafluoroethoxy)-3-(4-tertoctylphenoxy)-2-propanol (shown in Formula (I) below) was found to be especially effective with respect to affording a good balance of high cesium extractive strength and good phase-coalescence behavior. This modifier, a phenoxy fluoro-alcohol, code named "Cs-3", was recently found to be especially effective for cesium extraction from high sodium/low potassium alkaline nuclear waste such as that stored at the U.S. Department of Energy's (DOE's) Savannah River Site (SRS), giving rise to good (e.g., >10) cesium distribution ratios at low (0.01 Molar) concentrations of the calixarene-crown ether extractant. The magnitude of the cesium distribution ratio was also dependent upon such factors as temperature and the volume ratio of the aqueous and organic phases.

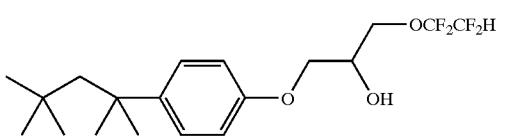

However, as shown in FIG. 9, the Cs-3 modifier was found to slowly degrade following prolonged contact with an SRS alkaline waste simulant (1.75 molar in free hydroxide), with a concomitant erosion in cesium extraction efficiency as measured by the cesium distribution ratio, $D_{Cs}$, making this modifier less than optimum for the sought solvent extraction process. Unlike the non-fluorinated modifiers described in U.S. patent application Ser. No. 09/146,800, Cs-3 contains a base-sensitive functional group (the tetrafluoroethoxy moiety, —$OCF_2CF_2H$). Following prolonged contact with strongly alkaline (>1 molar in free hydroxide) solutions, the Cs-3 modifier present in the solvent appears to react with itself in a condensation reaction, with concomitant loss of one tetrafluoroethoxy moiety to form a larger molecule which is ineffective as a modifier (a proposed mechanism is shown in FIG. 10). The solvent thus loses potency with respect to cesium extraction efficiency as a function of exposure time to hydroxide. The rate of modifier decomposition increases with temperature, and the rate of decomposition is also likely dependent on other factors such as the modifier concentration in the solvent, as well as the concentration of base. The other modifiers listed in U.S. patent application Ser. No. 09/146,800 that do not contain the 1,1,2,2-tetrafluoroethoxy moiety do possess good alkaline stability, but they are not as effective as the Cs-3 modifier with regard to both cesium extraction strength and phase-coalescence behavior from alkaline nitrate solutions, particularly solutions simulating SRS alkaline nuclear waste.

It is believed that the effectiveness of the Cs-3 modifier may be due to the properties of the alcohol (hydroxyl) functional group. The electron-withdrawing nature of the tetrafluoroethoxy moiety and its proximity to the alcohol (—OH) functionality increases both the acidity and hydrogen-bond donor ability of the hydroxyl group. In neutral and acidic aqueous media, the hydrogen-bonding capability of the hydroxyl group of phenoxy fluoro-alcohol modifier Cs-3 may enhance solvation of both the calixarene-crown ether-$Cs^+$ complex and the associated anion such as nitrate. Also, anion solvation would enhance extraction by lowering the energy required to transport the anion (such as nitrate) from the aqueous phase into the organic (solvent) phase. However, when the solvent containing the calixarene-crown ether and the Cs-3 modifier are used to extract cesium from strongly alkaline solutions, hydroxide, which can be co-extracted into the solvent phase (though not as easily as nitrate) can abstract the weakly acidic proton (hydrogen atom) from the hydroxyl group of the Cs-3 modifier. The deprotonated modifier, as an alkoxide anion, can either be an effective counter-anion to the calixarene-crown ether-$Cs^+$ complex, or can slowly react with excess Cs-3 modifier that is in the solvent to afford the condensation product shown in FIG. 10. The carbon atom to which the tetrafluoroethoxy group is attached is strongly electropositive and can be subject to nucleophilic attack. In the case where the alkoxide anion of Cs-3 is the nucleophile, a condensation reaction occurs in which a tetrafluoroethoxy group is eliminated to afford the condensation product. Over prolonged contact with alkaline solutions, especially at elevated temperatures, the Cs-3 modifier is thus consumed as it is converted to the condensation product shown in FIG. 10.

It should be noted that when the calixarene-crown ether extractant is not present in the solvent, the Cs-3 modifier is much more stable to alkaline solutions. This is because without the calixarene-crown ether extractant present, there is very little cesium or potassium ion extracted into the solvent phase, and accordingly very little hydroxide that would serve as the counter-anion co-extracted into the solvent phase that could react with the weakly acidic hydroxyl group of the Cs-3 modifier.

Accordingly, there is a need in the art for a phase modifier that possesses a high cesium extraction performance level similar to that of the Cs-3 modifier as previously described, but that is more chemically stable than the Cs-3 modifier to alkaline media.

OBJECTS AND SUMMARY OF THE INVENTION

In view of the above need, an object of the present invention is to provide a composition and process for the separation of cesium from alkaline waste solutions that contain large excesses of other alkali metal ions such as sodium and potassium.

A further object of the present invention is to provide a practical alkaline-side cesium extraction process.

It is also an object of the present invention to provide an improved composition and method for extracting cesium from acidic solutions.

Another object of the present invention is to provide a practical method for clean up of nuclear fission byproducts, such as that contained in waste tanks stored at DOE's Hanford, Wash., Savannah River, S.C. and Oak Ridge, Tenn. sites.

Yet another object of the present invention is to provide a method and composition for extracting cesium from hydrometallurgical process solutions.

Another object of the present invention is to provide a composition and method, which is a substantial component of a combined process for the removal of technetium and strontium, as well as cesium, from alkaline waste.

A further object of this invention is to provide for a new class of phenoxy fluoro-alcohols which serve as phase modifiers for use in the solvent extraction of cesium from aqueous solutions and which behave synergistically with the actual cesium extractant (a calixarene-crown ether), and function to greatly increase the extraction strength for cesium and maintain good solvation by preventing precipitation and third phase formation.

It is another object of this invention to provide phenoxy fluoro-alcohol phase modifiers which possess good stability to aqueous alkaline solutions and do not degrade to a condensation product as those previously described when in prolonged contact with strongly alkaline solutions, such as alkaline nuclear waste solutions.

It is still a further object of this invention to provide for a method for making phenoxy fluoro-alcohol phase modifiers.

Briefly, the present invention is a phenoxy fluoro-alcohol of Formula (II):

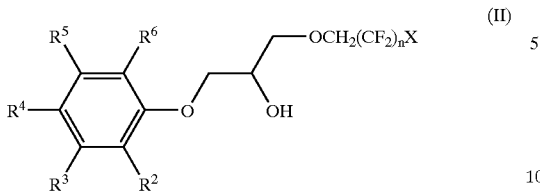

wherein for n=1 to 4 (preferably n=2 to 4), X=a hydrogen atom or a fluorine atom, $R^2$ and $R^6$ are each independently a hydrogen atom or $C_1$ alkyl, $R^4$ is a hydrogen atom or $C_1$–$C_{12}$ alkyl when $R^3$ and $R^5$ are each independently selected from a hydrogen atom or $C_1$–$C_2$ alkyl, and $R^3$ and $R^5$ are the same or different and each is hydrogen or $C_3$–$C_{12}$ alkyl when $R^4$ is a hydrogen atom or $C_1$ alkyl. Another embodiment is the phenoxy fluoro-alcohol according to Formula (II) in which n=2, X=a hydrogen atom, $R^2$, $R^3$, $R^5$, and $R^6$ are all hydrogen atoms, and $R^4$ is a $C_1$–$C_{12}$ straight-chain or branched alkyl group, preferably selected from the group consisting of n-propyl, isopropyl, $CH_3CH_2CH_2CH_2$-(n-butyl), $CH_3CH_2(CH_3)CH$-(sec-butyl), $(CH_3)_2CHCH_2$-(iso-butyl), $(CH_3)_3C$-(tert-butyl), $CH_3CH_2CH_2CH_2CH_2$-(n-pentyl), $(CH_3)_2CHCH_2CH_2$-(isoamyl), $(CH_3)_3CCH_2$-(neopentyl), $CH_3CH_2C(CH_3)_2$-(tert-amyl), $CH_3CH_2CH_2CH_2CH_2CH_2$-(n-hexyl), $CH_3CH_2CH_2CH_2CH(CH_2CH_3)CH_2$-(2-ethylhexyl), $(CH_3)_3C$—$CH_2$—$C(CH_3)_2$-(tert-octyl), and $CH_3CH_2CH_2CH_2CH_2CH_2CH_2CH_2$-(n-octyl).

The invention also provides a process for the preparation of a phenoxy fluoro-alcohol according to Formula (II) as above comprising the steps of a) reacting a phenol of Formula (III):

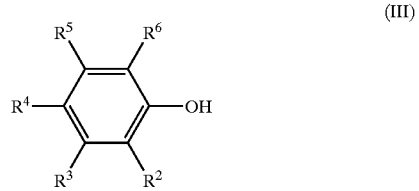

wherein $R^2$ and $R^6$ are each independently a hydrogen atom or $C_1$ alkyl, $R^4$ is a hydrogen atom or $C_1$–$C_{12}$ alkyl when $R^3$ and $R^5$ are each independently selected from a hydrogen atom or $C_1$–$C_2$ alkyl, and $R^3$ and $R^5$ are the same or different and each is hydrogen or $C_3$–$C_{12}$ alkyl when $R^4$ is a hydrogen atom or $C_1$ alkyl, with a glycidyl fluoroalkyl ether of Formula (IV):

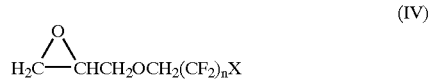

wherein n=1 to 4 (preferably n=2 to 4), X=a hydrogen atom or a fluorine atom, and (b) separating the phenoxy fluoro-alcohol obtained from the reaction mixture. Preferably, the process for the preparation of a phenoxy fluoro-alcohol comprises the steps of a) reacting a phenol of Formula (III) as above wherein $R^2$, $R^3$, $R^5$, and $R^6$ are all hydrogen atoms, and $R^4$ is a $C_1$–$C_{12}$ straight-chain or branched alkyl group, with glycidyl fluoroalkyl ether of Formula (IV) as above in which n=2 and X is a hydrogen atom, and b) separating the phenoxy fluoro-alcohol obtained from the reaction mixture. $R^4$ of the phenol according to Formula (III) is preferably selected from the group consisting of n-propyl, isopropyl, $CH_3CH_2CH_2CH_2$-(n-butyl), $CH_3CH_2(CH_3)CH$-(sec-butyl), $(CH_3)_2CHCH_2$-(iso-butyl), $(CH_3)_3C$-(tert-butyl), $CH_3CH_2CH_2CH_2CH_2$-(n-pentyl), $(CH_3)_2CHCH_2CH_2$-(isoamyl), $(CH_3)_3CCH_2$-(neopentyl), $CH_3CH_2CH_2CH_2CH(CH_2CH_3)CH_2$-(2-ethylhexyl), $(CH_3)_3C$—$CH_2$—$C(CH_3)_2$-(tert-octyl), and $CH_3CH_2CH_2CH_2CH_2CH_2CH_2CH_2$-(n-octyl).

Furthermore, the present invention is directed to a composition for extracting cesium from alkaline solutions comprising a) a phenoxy fluoro-alcohol of Formula (II) as above, b) an alkane-soluble calixarene-crown ether of Formula (V):

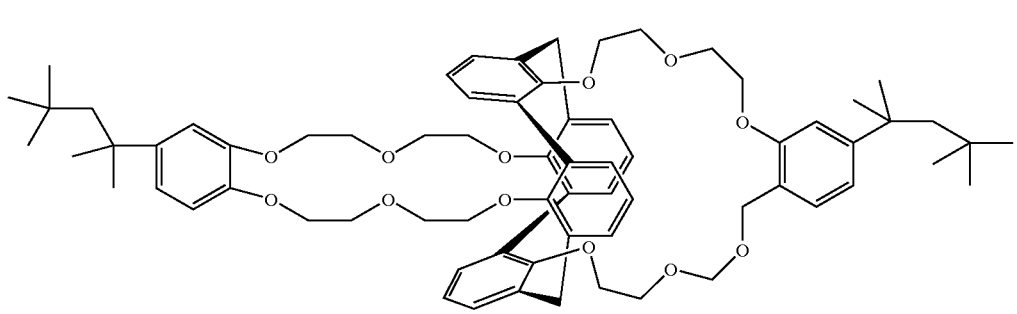

c) a water-immiscible hydrocarbon diluent, and d) an aliphatic amine, preferably a tertiary amine of formula $(C_nH_{2n+1})_3N$ in which n=6 to 12, most preferably where n=8. For the phenoxy fluoro-alcohol of Formula (II), it is preferable that n=2, X=H, R2, R3, R5, and R6=H, and R4 be an alkyl group of 4–6 carbon atoms. It is most preferable that R4 be a sec-butyl group. This phenoxy fluoro-alcohol would have the chemical name 1-(2,2,3,3-tetrafluoropropoxy)-3-(4-sec-butylphenoxy)-2-propanol.

The invention also provides a process for extracting cesium and other metals from alkaline waste solutions comprising the steps of a) contacting a volume of an aqueous feed solution containing cesium with a solvent comprising: an alkane-soluble calix crown ether according to Formula (V) above, a water-immiscible hydrocarbon diluent, an aliphatic amine, preferably a tertiary amine of formula $(C_nH_{2n+1})_3N$ in which n=6 to 12 (most preferably where n=8), and a phenoxy fluoro-alcohol of Formula (II) above; b) contacting a volume of the solvent obtained above containing the portion of cesium, with a volume of a scrubbing solution, comprised of dilute mineral acid having between 30 and 200 millimolar concentration, thereby removing substantially all the other alkali metal ions (such as sodium and potassium), while retaining in the solvent a substantial portion of the cesium values; c) contacting a volume of the solvent obtained after scrubbing above with a volume of a stripping solution, comprised of pure water, dilute salt, or dilute mineral acid having up to 10 millimolar concentration, thereby removing the cesium values from the solvent phase into the stripping solution to make the organic solution containing the calixarene-crown ether, the phenoxy fluoro-alcohol, and the tertiary amine available for reuse.

Additional objects, advantages, and novel features of the invention will be set forth in part in the description which follows, and in part will become apparent to those skilled in the art upon examination of the following or may be learned by the practice of the invention. The objects and advantages may be realized and attained by means of the instrumentalities and combinations particularly pointed out herein and in the appended claims.

BRIEF DESCRIPTION OF THE DRAWINGS

The accompanying drawings, which are incorporated in and form a part of the specification, illustrate preferred embodiments of the invention, and together with the description, serve to explain principles of the invention.

FIG. 1A is a diagram of a calix[4]arene-bis-(tert-octylbenzo-crown-6) ether molecule which is also referred to as BoBCalix[4]Crown6 (Formula (V)).

FIG. 1B is a diagram of the 1) calix[4]arene crown-6 ether molecule and 2) calix[4]arene-bis-crown-6 ether molecule.

FIG. 1C is a diagram of the derivatives of the molecules depicted in FIG. 1B useful in the present invention, wherein each substituent R independently represents alkyl, cycloalkyl, doubly substituted (alkyl or branched alkyl substituted) cycloalkyl, doubly substituted (alkyl or branched alkyl substituted) alkyl-aryl functional groups, and wherein all R groups may be either identical groups, different groups, or in any combination thereof.

FIG. 2 is a diagram of two types of modifiers useful in the present invention. Here $R^{2-5}$ are alkyl substituents (including hydrogen) each having either zero or at least two carbon atoms.

FIG. 5 is a diagram of three methods for preparing the modifiers described in the present invention.

FIG. 6 is a diagram of three different specific applications of Method One shown in FIG. 5 for the preparation of bifunctional modifiers starting from but not limited to catechols, resorcinols and bis-phenols.

FIG. 12 depicts names and structures of four phenoxy fluoro-alcohol phase modifiers.

DETAILED DESCRIPTION

Figure 1D:
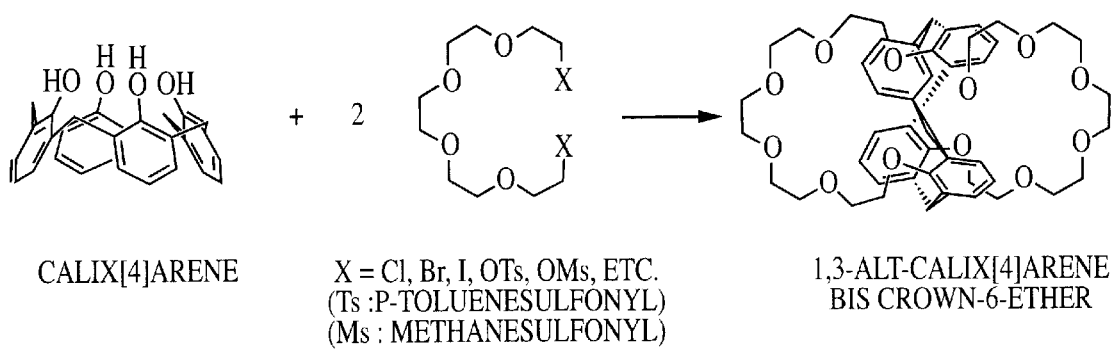
FIG. 1D is a diagram of the synthesis of a 1,3-alt-calix[4]arene bis crown-6-ether.
Figure 1E:
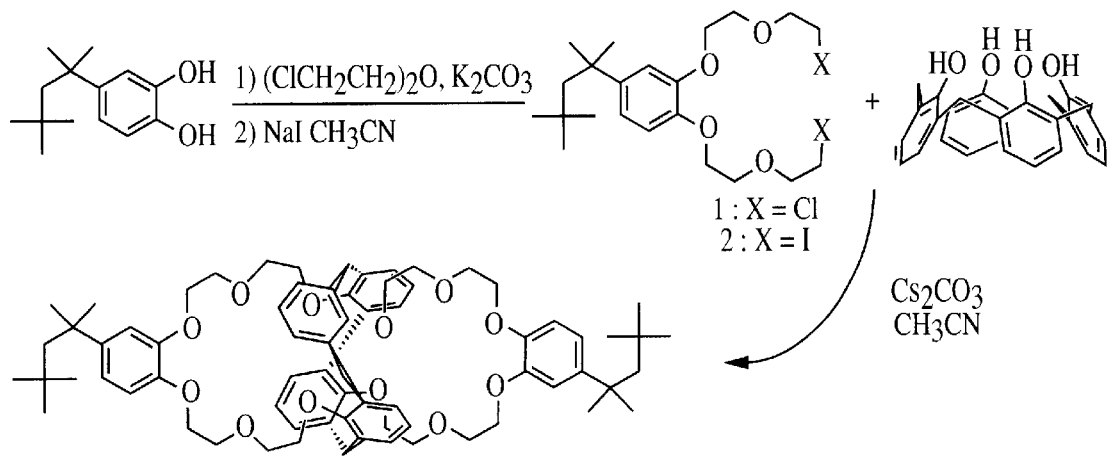
FIG. 1E is a diagram of the synthesis of calix[4]arene-bis-[(4-tert-octyl-benzo)-crown6] ether.
Figure 3A:
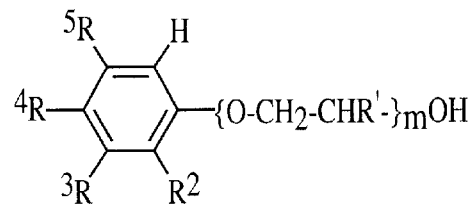
FIG. 3A is a diagram of representative examples of modifiers of the first type shown in FIG. 2.
Figure 3B:
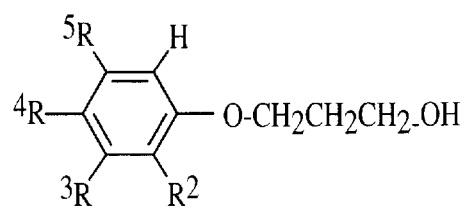
FIG. 3B is a diagram of representative examples of modifiers of the second type shown in FIG. 2.
Figure 4A:
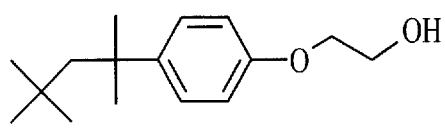
FIG. 4 is a diagram of structures of modifiers A–G shown in FIGS. 3A and 3B.
Figure 4B:
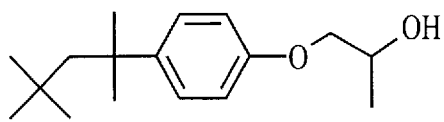
Figure 4C:
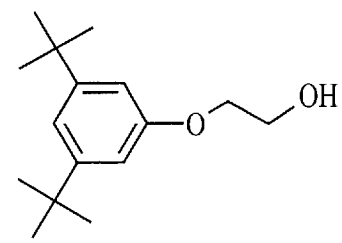
Figure 4D:
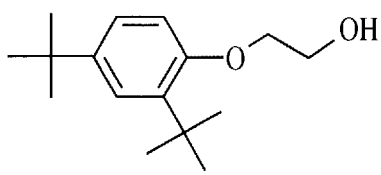
Figure 4E:
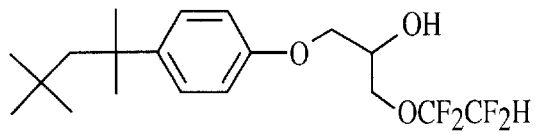
Figure 4F:
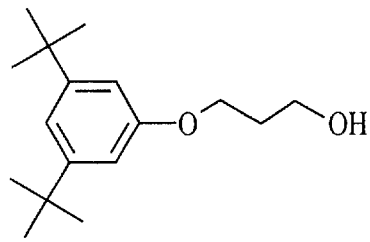
Figure 4G:
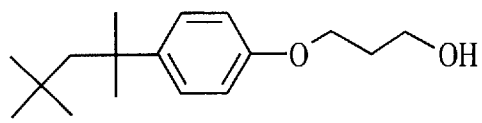
Figure 7:
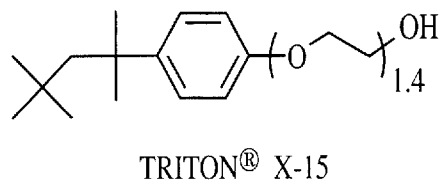
FIG. 7 is a diagram of the alkylaryl polyether alcohol mixture, Triton® X-15.
Figure 8:
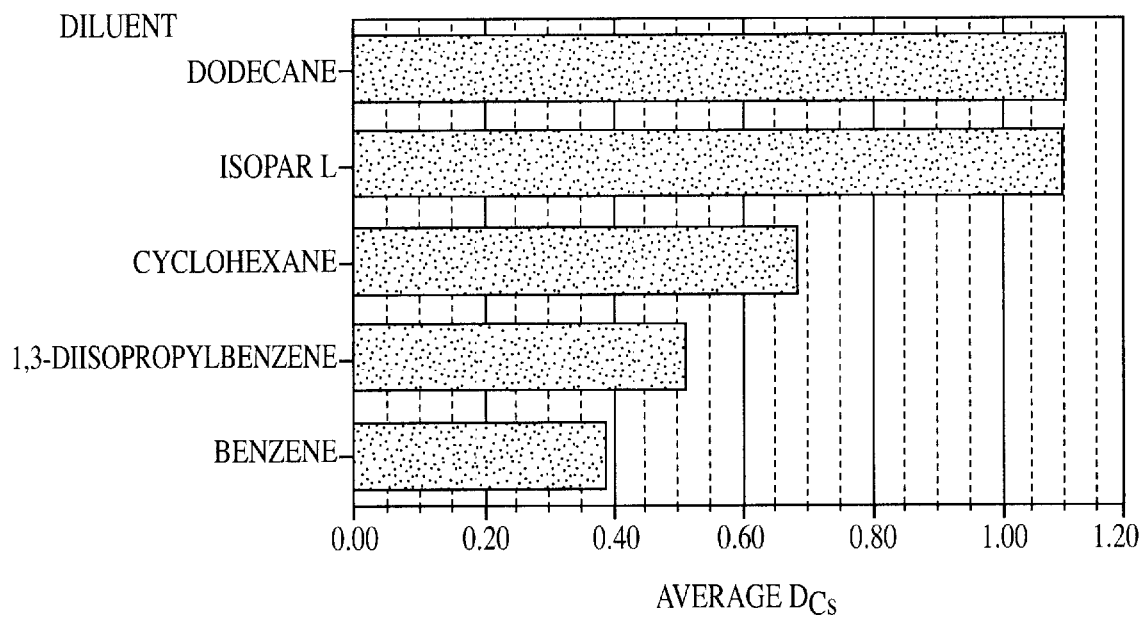
FIG. 8 is a bar graph designating the extractability of cesium from a Hanford site waste simulant by 0.01 molar BoBCalix[4]Crown6-ether in various diluents containing 0.05 molar Tritone X-15.
Figure 9:
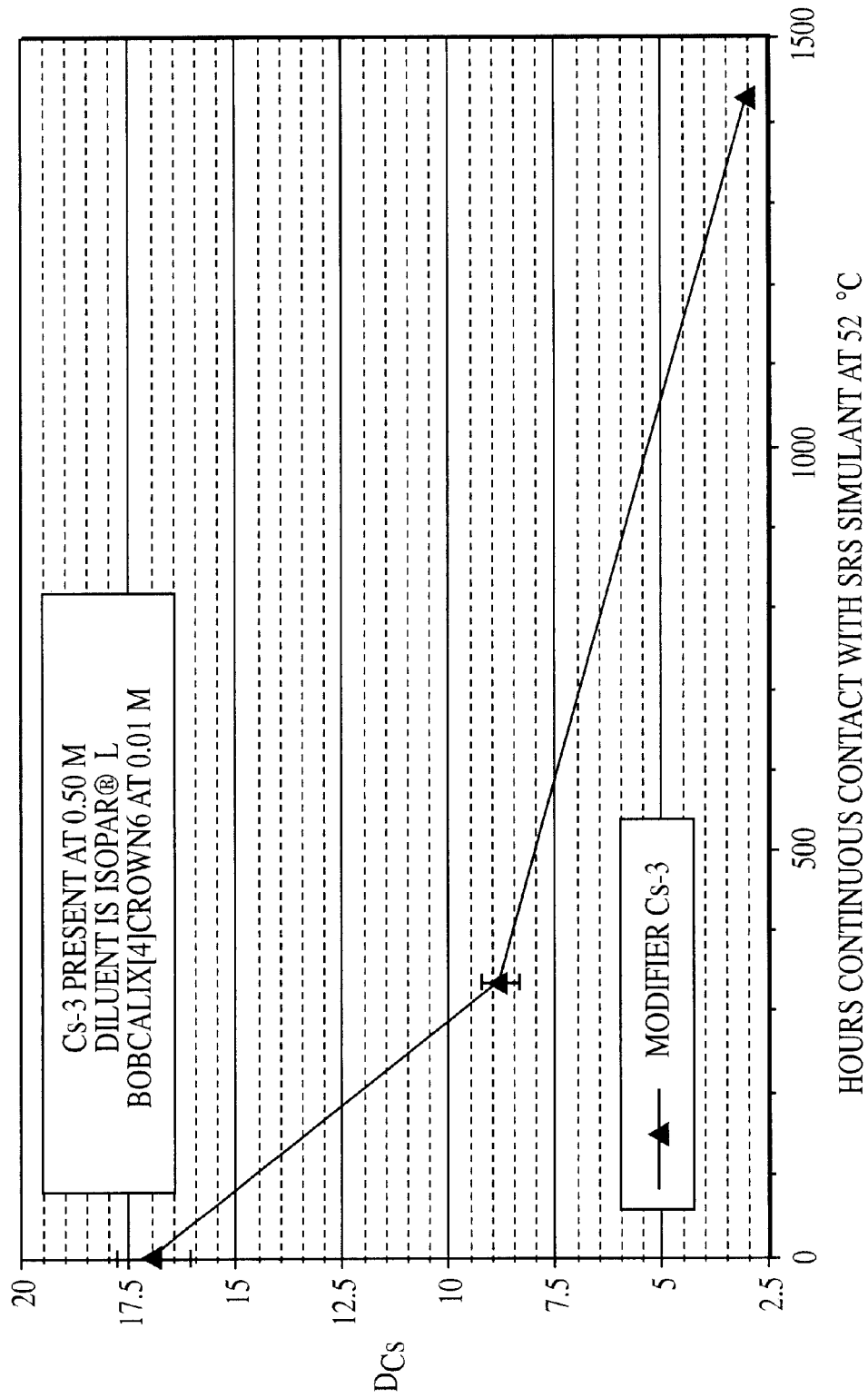
FIG. 9 is a graph showing the erosion of the cesium distribution value, $D_{Cs}$, with exposure time of a solvent containing the Cs-3 modifier at a concentration of 0.500 molar with an alkaline simulant of a Savannah River site (SRS) waste (Table 1) at 52° C.

According to this invention it has been found that an efficient solvent extraction and stripping process for cesium and other metals is accomplished utilizing a specially formulated solvent. This solvent is useful for the removal of cesium, from alkaline aqueous solutions such as tank waste originating from the reprocessing of irradiated nuclear fuels, especially solutions containing high concentrations of the alkali metals sodium and potassium. The solvent comprises a lipophilic calixarene-crown ether such as calix[4]arene-bis-[(4-tert-octyl-benzo)-crown-6] ("BoBCalix[4]Crown6", as shown in FIG. 1A and Formula (V)), one or more modifiers, and an aliphatic amine dissolved together in an aliphatic hydrocarbon diluent.

The process of the present invention extracts all isotopes of cesium from aqueous alkaline solutions. This is achieved through a number of conventional applications, including but not limited to, conventional liquid-liquid extraction, solvent impregnated resins, and membrane extraction methods.

Such removal of cesium is accomplished for example by contacting the aqueous feed solution with an approximately equal volume of a solvent composed of BoBCalix[4]Crown6 at about a 0.001 to 0.20 molar concentration (0.01 molar preferred) in a water-immiscible organic diluent containing one or more modifiers at about a 0.10 to 1.0 molar total concentration (0.50 to 0.75 molar preferred), and an amine at about 0.0001 to 0.01 molar concentration, whereby the cesium ions are extracted into the organic phase. Subsequent contacting of the organic phase containing the cesium ions with approximately equal volumes of a scrubbing solution comprised of dilute nitric acid (up to 200 millimolar nitric acid, with 50 millimolar preferred) is preferred, such that substantially all co-extracted cations such as sodium and potassium ion are removed from the solvent. Subsequent contacting of the organic phase still containing cesium ions with approximately equal volumes of for example pure water or dilute nitric acid (up to 10 millimolar nitric acid, with 1 millimolar preferred) affords removal of the cesium values from the organic phase into the stripping solution, whereby the organic solution containing the BoBCalix[4]Crown6 extractant, modifier, and aliphatic amine is regenerated.

However, it is not a requirement that the aqueous feed solution and solvent volumes, nor the aqueous stripping scrubbing and solvent volumes, nor the aqueous solution and solvent volumes, be equal. The volume ratio of the aqueous feed solution to the solvent, the volume ratio of the aqueous scrubbing solution to the solvent, and the volume ratio of the aqueous stripping solution to the solvent, can range from 0.05 to 20, depending on the desired degree of concentration in the extracting phase. When extracting a material out of a feed solution with a solvent, it is often desirable to employ a smaller volume of the solvent to the feed solution (feed to solvent ratio greater than one). This concentrates the material in the solvent. It is likewise desirable when scrubbing and stripping the extracted material out of the solvent to employ smaller volumes of aqueous scrubbing and stripping solutions relative to the solvent (scrub and strip solution to solvent ratio less than one). In this manner, the concentration of the material in the scrubbing and stripping aqueous phase can be higher than it was in the original feed solution. This concentration makes it easier to dispose of the extracted material into a small volume in a final waste form, such as glass or cement.

For the aqueous alkaline waste solutions, typical concentrations of all isotopes of cesium taken together range about $5 \times 10^{-7}$ to $5 \times 10^{-3}$ molar. For practicing the invention to treat neutral or alkaline solutions, the waste solution should also contain hydroxide having a concentration ranging from about $1.0 \times 10^{-7}$ molar to 10 molar (pH should be above about 7), with about 0.010 to 5.0 molar being typical. It can also contain other alkali metals such as sodium in the concentration range from about 0.01 to 10 molar, potassium from about 0.001 to 2 molar, and other anions such as nitrate in the concentration range from about 0.001 to 5.0 molar.

Therefore, the preferred embodiment of the present invention is a process-suitable solvent for use in a solvent extraction and stripping process for the removal of cesium from neutral and alkaline solutions, particularly for those solutions containing large excesses of sodium and potassium relative to the cesium present, and especially for such solutions that constitute radioactive waste containing cesium-137. The process-suitable solvent is composed of a calixarene-crown compound that possesses substituents that permit its solubility in aliphatic kerosene diluents, and one or more modifiers which have been selected to act along with the calixarene-crown compound in the aliphatic kerosene diluent to obtain useful (greater or equal to unity at equal organic to aqueous phase volume ratios) extraction ratios for cesium, while at the same time allowing for acceptable regeneration of the solvent via scrubbing and stripping, and good phase coalescence behavior. (These modifiers are chemically stable, non-toxic, and have flash points above 60° C.). Thus, the preferred method includes use of BoBCalix[4]Crown6 shown in FIG. 1A and Formula (V), or any of the similar substituted derivatives shown in FIG. 1C, as well as any combinations thereof; with an aliphatic amine, preferably a tertiary amine of formula $(C_nH_{2n+1})_3N$ in which n=6 to 12, most preferably where n=8; with the modifier shown in FIG. 4 as E, 1-(1,1,2,2-tetrafluoroethoxy)-3-(4-tert-octylphenoxy)-2-propanol (Cs-3, Formula (I)) or any of the similar substituted derivatives A–D and F–G, or preferably with the modifiers shown in Formula (II), or more preferably with the modifiers shown in FIG. 12 in Isopar® L or a similar solvent extraction process-suitable kerosene diluent.

Figure 10:
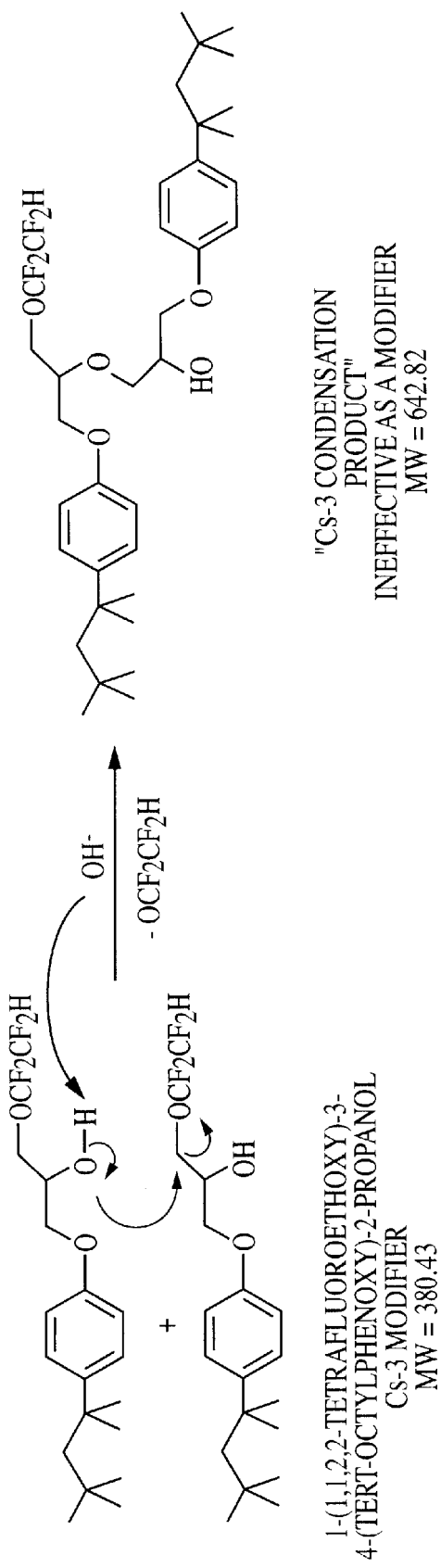
FIG. 10 depicts one possible mechanism showing how Cs-3 modifier reacts with itself following prolonged contact with aqueous hydroxide to afford a condensation product having decreased effectiveness for cesium extraction.
Figure 11:
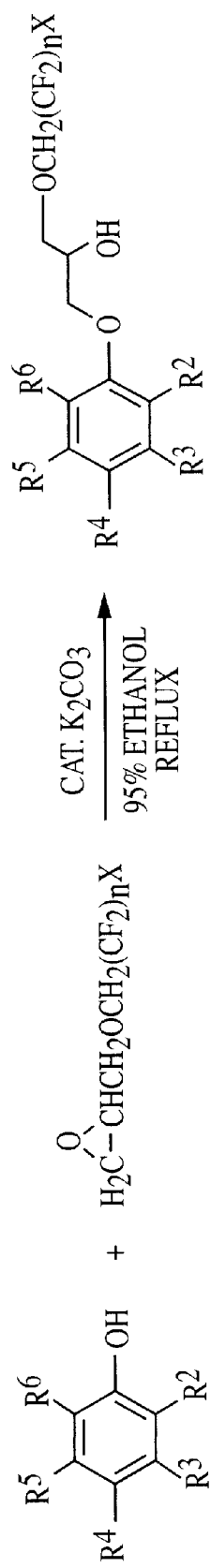
FIG. 11 is a scheme showing the preparation of phenoxy fluoro-alcohols conforming to Formula (II) by reacting phenols conforming to Formula (III) with glycidyl fluoro-alkyl ethers conforming to Formula (IV).

It has been found that a new class of phenoxy fluoroalcohols, which are related to 1-(1,1,2,2-tetrafluoroethoxy)-3-(4-tert-octylphenoxy)-2-propanol (Cs-3), are more stable to base, and do not undergo the condensation reaction under the conditions depicted in FIG. 10 for the Cs-3 modifier. These new modifiers retain most of the potency of the parent Cs-3 modifier, are more potent than the other (base-stable) modifiers A–D and F–G listed FIG. 4, and can be used as direct replacements for the Cs-3 modifier in the solvent. The improvement consists of inserting a methylene group between the ether oxygen and the tetrafluoroethyl moiety (i.e., the new modifiers possess a —$OCH_2CF_2CF_2H$ moiety instead of —$OCF_2CF_2H$). The general structure for this class of modifiers is shown as above in Formula (II), in which n=1–4 (preferably n=2–4); X represents a hydrogen or a fluorine atom; and $R^2$–$R^6$ are hydrogen or alkyl substituents.

The presence of the methylene group as a spacer between the fluorinated moiety and the oxygen atom decreases the amount of electropositive character of the carbon to which the —$OCH_2CF_2CF_2H$ moiety is attached, making that carbon less subject to nucleophilic attack. In addition, the carbon-oxygen (C—O) bond strength between this carbon and the —$OCH_2CF_2CF_2H$ moiety should be higher (than in the case of —$OCF_2CF_2H$), making it more difficult for bond breakage and loss of a —$OCH_2CF_2CF_2H$ moiety to occur. The acidity and hydrogen-bond donor strength of the hydroxyl group in this class of modifiers is believed to be somewhat less than in the Cs-3 class of modifiers, but still sufficient enough for these modifiers to be effective for achieving high cesium distribution ratios.

In fact, when the two modifiers Cs-3 and Cs-7SB (the former bearing the —$OCF_2CF_2H$ moiety and the latter bearing the —$OCH_2CF_2CF_2H$ moiety) are mixed in equal, proportions in a solvent, and contacted with alkaline cesium-containing waste simulants for prolonged periods of time at elevated temperatures (60° C.), two condensation products are produced. The first is the product of Cs-3 condensing with itself as previously shown in FIG. 10. The second is the product of Cs-7SB, in its deprotonated form, condensing with Cs-3 with loss of the —$OCF_2CF_2H$ moiety from Cs-3. Thus, Cs-7SB is acidic enough to be deprotonated and "attack" the methylene group of modifier Cs-3 to which the —$OCF_2CF_2H$ moiety is attached to form a Cs-7SB-Cs-3 condensate (in which the —$OCF_2CF_2H$ moiety was lost from Cs-3). However, products arising from the condensation of Cs-7SB with itself, or with deprotonated Cs-3 "attacking" the methylene group of modifier Cs-7SB to which the —$OCH_2CF_2CF_2H$ moiety is attached, are not observed under typical extraction conditions.

The modifiers conforming to Formula (II) can be prepared by reacting a phenol as in Formula (III) above, in which $R^2$ and $R^6$ are each independently a hydrogen atom or $C_1$ alkyl, $R^4$ is a hydrogen atom or $C_1$–$C_{12}$ alkyl when $R^3$ and $R^5$ are each independently selected from a hydrogen atom or $C_1$–$C_2$ alkyl, and $R^3$ and $R^5$ are the same or different and each is hydrogen or $C_3$–$C_{12}$ alkyl when $R^4$ is a hydrogen atom or $C_1$ alkyl, with a glycidyl fluoroalkyl ether of Formula (IV) above, in which n=1 through 4 (preferably n=2 to 4), X is a hydrogen atom or a fluorine atom, and separating the product from the reaction mixture.

For the cases where the phenoxy fluoro-alcohol modifiers conforming to Formula (II) are to be used in a solvent to extract radioactive cesium (such as cesium-137 and cesium-135) from alkaline waste solutions, radiolytic degradation of all the solvent components, including the fluoro-alcohol modifiers, will eventually occur. Among the main products of radiolytic degradation of the modifiers are the free phenols as per Formula (III) from which they were made. In a solvent extraction process, it is convenient and advantageous to be able to wash radiolytic degradation products out of the solvent. This can be accomplished by contacting the solvent with alkaline solutions such as 0.5 molar is sodium hydroxide, in which the phenol can partition to the alkaline aqueous phase as a sodium phenoxide salt provided that the total number of carbon atoms comprising the alkyl R groups ($R^2$ through $R^6$ in Formula II) attached to the phenol are not greater than about six. It is preferable that the total number of carbon atoms comprising the alkyl R groups be between 4 and 6, such that the phenolic radiolytic degradation product can be washed out of the solvent using 0.1 to 1 molar base, while at the same time the phenoxy fluoro-alcohol phase modifier will exhibit only minor partitioning to the aqueous alkaline waste solution. Thus, it is preferable that the total number of carbon atoms comprising the alkyl R groups attached to the aromatic ring of the modifier be at least about four to prevent loss of the modifier to the aqueous waste phase, but smaller than about six so that phenols arising from radiolytic degradation can be washed out of the solvent. In this way, the solvent can be cleaned up by washing out the radiolytic degradation products, and restored to potency by the addition of fresh modifier.

EXAMPLES

The following examples are given to illustrate the method of the present invention and are not to be taken as limiting the scope of the invention which is defined herein and in the appended claims.

Materials

For all examples below, all salts and solvents were reagent grade and were used as received. Distilled, deionized water was obtained from a Barnstead Nanopure filtering system (resistivity 18 M-cm) and was used to prepare all aqueous solutions, including the simulant. The Savannah River Site simulant was prepared as previously described for the simulant designated as SRS #2-1 in P. V. Bonnesen, et al, "Alkaline-Side Extraction of Cesium from Savannah River Tank Waste Using a Calixarene-Crown Ether Extractant", Report ORNL/TM-13704, Oak Ridge National Laboratory, Oak Ridge, Tenn., 1998, hereby incorporated by reference (hereinafter Report ORNL/TM-13704); the composition is shown in Table 1. Nitric acid was Ultrex II grade (J. T. Baker). Dilute nitric acid solutions were prepared by volumetric dilution, and the pH was checked using an Orion® Model 230A pH meter with an Orion® Ross 8103 pH electrode. The meter was always calibrated (two-point) prior to use. The solvents investigated were comprised of the isoparaffinic diluent Isopar® L (ExxonMobil Chemical Co.), tri-n-octylamine (Aldrich Chemical Co.), the calixarene crown ether calix[4]arene-bis-(tert-octylbenzo-crown-6) and a solvent modifier. The tri-n-octylamine (TOA) was purified by the procedure previously described in B. A. Moyer, and W. J. McDowell, Sep. Sci. Technol. 22, 417–445 (1987), hereby incorporated by reference, prior to use. The calix[4]arene-bis-(tert-octylbenzo-crown-6) (henceforth referred to as "BoBCalix[4]Crown6") used in these studies was manufactured by IBC® Advanced Technologies, American Fork, Utah (Batch 990521 KC-428) following the synthetic procedure described in U.S. patent application Ser. No. 09/146,800, filed Sep. 3, 1998.

The following organic reagents employed in the preparation of the new modifiers were used as received from Aldrich Chemical Co.: glycidyl 2,2,3,3-tetrafluoropropyl ether (97%), 4-tert-octylphenol (97%), 4-tert-butylphenol (99%), 4-tert-amylphenol (99%), and 4-sec-butylphenol (technical grade, 90%). The Cs-7SBT modifier was prepared from the technical grade 4-sec-butyl phenol (94% pure by GC analysis), which also contains small amounts of 2-sec-butyl phenol and 2,6-di-sec-butyl phenol. The modifier Cs-7SB was prepared from high purity 4-sec-butylphenol (TCI America, 98+%). The modifier Cs-3 was prepared from 4-tert-octylphenol (Aldrich, 97%) and glycidyl 1,1,2,2-tetrafluoroethyl ether (Aldrich, 98%) as previously described in U.S. Patent application Ser. No. 09/146,80, filed Sep. 3, 1998, and Report ORNL/TM-13704

TABLE 1

Composition of Savannah River Simulant[a]

| Component | Molarity | Component | Molarity |
|---|---|---|---|
| $Na^+$ | 7.0 | $F^-$ | 0.050 |
| $K^+$ | 0.020 | $NO_2^-$ | 1.0 |
| $Cs^+$ | $7.00 \times 10^{-4}$ | $NO_3^-$ | 2.7 |
| $Al(OH)_4^-$ | 0.40 | $OH^-$ (free)[b] | 1.9 |
| $Cl^-$ | 0.10 | $OH^-$ (total) | 3.5 |
| $CO_3^{2-}$ | 0.20 | $SO_4^{2-}$ | 0.22 |
| $CrO_4^{2-}$ | 0.015 | | |

[a]The composition shown here is the same as that reported in P. V. Bonnesen, L. H. Delmau, B. A. Moyer, and R. A Leonard "A Robust Alkaline-Side CSEX Solvent Suitable for Removing Cesium from Savannah River High Level Waste," (Solvent Extr. Ion Exch, 2000, 18(6) 1079–1108), hereby incorporated in its entirety by reference.
[b]Reflects consumption of the stoichiometric concentration of $OH^-$ associated with $Al(OH)_4^-$ ion.

Cesium-137 Radiotracers.

The Cs-137 radiotracer used for spiking the waste simulant was obtained chemically as CsCl in 1 molar HCl from Amersham (Arlington Heights, Ill.) or Isotope Products Laboratories (Burbank, Calif.) and was used as received. Scrubbing and stripping contacts, $^{137}CsNO_3$, was prepared as follows: a portion of the $^{137}CsCl$ in 1 molar HCl was converted to $^{137}CsNO_3$ in water by passage through a small column containing Amberlite® IRA-900 anion exchange resin which had been converted to the nitrate form, in the manner previously described in Report ORNL/TM-13704.

Cesium-137 Tracer Experiments—General

As a general procedure, batch-equilibrium liquid-liquid contacting experiments were performed in polypropylene or Teflon® FEP tubes. For most contacting experiments, appropriate volumes of aqueous and organic phases were contacted for 30 min at 25±0.2° C. by end-over-end rotation at 35±5 RPM using a Glass-Collaboratory rotator placed inside a constant-temperature airbox. The tubes were then centrifuged for three to five minutes at 2900×g in a refrigerated centrifuge maintained at 25±0.2° C. (Sanyo MSE Mistral 2000R) to ensure complete phase separation. Aliquots of each phase were removed for $^{137}Cs$ activity analysis, and cesium distribution ratios ($D_{Cs}$) were determined as the ratio of the $^{137}Cs$ activity in the organic phase to the $^{137}Cs$ activity in the aqueous phase at equilibrium, and are reproducible to within ±5%.

Gamma Counting

The cesium activity in the samples was determined by standard gamma counting techniques using a Packard® Cobra Quantum Model 5003 gamma counter equipped with a 3" NaI(TI) crystal through-hole type detector. A counting window of 580 to 750 keV was employed for the 662 keV emission from $^{137m}Ba$. Count times varied with the activity of the sample, but were generally long enough to ensure that a total of 1000 total counts had been collected.

Nuclear Magnetic Resonance Spectrometry

Nuclear Magnetic Resonance spectra were obtained on a Bruker MSL 400 NMR spectrometer operating at 400.13 MHz for proton, 100.61 MHz for carbon, and 376.498 MHz for fluorine.

Examples 1–4
General Procedure for the Synthesis of Modifiers Cs-6, Cs-7TB, Cs-7SBT, and Cs-7TA The phenoxy fluoro-alcohols Cs-6 (1-(2,2,3,3-tetrafluoropropoxy)-3-(4-tert-octylphenoxy)-2-propanol), Cs-7TB (1-(2,2,3,3-tetrafluoropropoxy)-3-(4-tert-butylphenoxy)-2-propanol), Cs-7SBT/Cs-7SB (1-(2,2,3,3-tetrafluoropropoxy)-3-(4-sec-butylphenoxy)-2-propanol), and Cs-7TA (1-(2,2,3,3-tetrafluoro-propoxy)-3-(4-tert-amylphenoxy)-2-propanol) (FIG. 12) are prepared from the reaction of glycidyl 2,2,3,3-tetrafluoropropyl ether and the respective alkylphenol. To a stirred solution of the appropriate alkylphenol (0.20 mol) and ground potassium carbonate (0.023 mol) in 95% ethanol (140–150 mL) at 60° C. under argon was added neat glycidyl 2,2,3,3-tetrafluoropropyl ether (0.21 mol) dropwise neat via pressure-equalizing addition funnel over the course of approximately ten minutes. The reaction mixture was brought to a gentle reflux, and the progress of the reaction monitored using TLC ($SiO_2$; 80/20 hexanes/ethyl acetate). Conversion of the phenol is 98–99+% complete after about 24 hours of reflux; addition of more epoxide is generally not practical, as it tends to lead to an increase in the amount of polymeric byproducts formed. At the end of the reflux period the reaction was allowed to cool to 30–40° C., and the ethanol removed at 40° C. by rotary evaporation. The straw-colored oily residue was dissolved in hexanes (200 mL), washed once with 5% NaOH (100 mL), washed twice with water (100 mL each), and washed once with saturated sodium carbonate (100 mL). After drying over anhydrous magnesium sulfate, the solution was filtered and the hexanes were removed by rotary evaporation to afford the crude product.

Residual phenol is an undesirable component in the solvent since it can act as a cation-exchanger. If the residual phenol content is greater than 0.5 mole % of the product modifier, then it is useful to render the phenol inactive to cation exchange by methylation. (It is difficult to remove the residual phenol from the product modifier by distillation.) The much greater acidity of the phenol hydroxyl group relative to the modifier (alcohol) hydroxyl group allows the phenol hydroxyl group to be selectively methylated in the presence of the modifier with essentially negligible occurrence of methylation of the modifier hydroxyl group. To methylate the residual phenol (when present at about 0.5–2 mole %), the round bottom flask containing the crude product was charged with a stir bar, potassium carbonate (0.01 mol), 20 mL dry acetone (to lower the viscosity), and iodomethane (J. T. Baker, 0.012 mol). (Caution: iodomethane is a carcinogen; use only in a well-functioning fume hood.) The flask was sealed with a plastic cap and joint clamp, and the contents heated at 57–63° C. for three days with stirring. The volatiles were removed in vacuo, and the residue dissolved in 170–190 mL hexanes, washed with two-three ca. 80-mL portions of distilled water, and dried over anhydrous magnesium sulfate. After filtration and evaporation, purification of the product is accomplished by fractional distillation using a glass Vigreux column under oil-pump vacuum (0.1 mmHg typically). The modifiers are isolated as colorless (or straw-colored for the 4-tert-amyl derivative Cs-7TA), viscous oils in yields ranging typically from 88–93%.

Example 1
1-(2,2,3,3-Tetrafluoropropoxy)-3-(4-tert-octylphenoxy)-2-propanol, Cs-6.

Prepared from 4-tert-octylphenol. Yield 93% (after vacuum distillation at 163–166 ° C. at 0.20–0.25 mmHg) of a colorless oil. The product has the following characteristics. $^1$H NMR (400.13 MHz, $CDCl_3$): 0.72 (s, 9H, $(CH_3)_3CCH_2C(CH_3)_2$—), 1.35 (s, 6H, $(CH_3)_3CCH_2C(CH_3)_2$—), 1.71 (s, 2H, $(CH_3)_3CCH_2C(CH_3)_2$—), 2.56 (d, J=4 Hz, 1H, OH; note: the hydroxyl proton is "mobile"), 3.77 (m, 2H, $ArOCH_2CH$), 3.76 (m, 2H, $ArOCH_2CH$), 3.92 (t of t, $J_{HF}$=12.6, 1.6 Hz, 2H, —$CH_2OCH_2CF_2CF_2H$), 4.01 (m, 2H, —$CH_2OCH_2CF_2CF_2H$), 4.17 (m, 1H, $ArOCH_2CH$), 5.91 (t of t, $J_{HF}$=53, 4.8 Hz, 1H, —$CH_2OCH_2CF_2CF_2H$), 6.83 (d, J=8.7 Hz, 2H, ArH2, ArH6), 7.28 (d, J=8.7 Hz, 2H, ArH3, ArH5); $^{13}C\{^1H\}$ (100.61 MHz, $CDCl_3$): 31.6, 31.7 (methyl groups on tert-octyl group), 32.2 $(CH_3)_3CCH_2C(CH_3)_2$—), 37.9 $(CH_3)_3CCH_2C(CH_3)_2$—), 56.9 $(CH_3)_3CCH_2C(CH_3)_2$—), 68.4 (t, $J_{CF}$=28 Hz, —$CH_2OCH_2CF_2CF_2H$), 68.6 (—$CH_2OCH_2CF_2CF_2H$); 69.1 ($ArOCH_2CH$), 73.4 ($ArOCH_2CH$), 109.2 (t of t, $J_{CF}$=249, 35 Hz, —$CH_2OCH_2CF_2CF_2H$), 113.7 (ArC2, ArC6), 114.9 (t of t, $J_{CF}$=249, 28 Hz, —$CH_2OCH_2CF_2CF_2H$), 127.1 (ArC3, ArC5), 142.9 (ArC4), 156.0 (ArC1); $^{19}F$ (376.498 MHz, $CDCl_3$): -124.9 (s, —$CH_2OCH_2CF_2CF_2H$), -139.3 (d, $J_{HF}$= 53 Hz —$CH_2OCH_2CF_2CF_2H$). The product contains 1% 4-tert-octyl anisole (which is inert as a modifier) from the methylation of the residual phenol.

Example 2
1-(2,2,3,3-Tetrafluoropropoxy)-3-(4-tert-butylphenoxy)-2-propanol, Cs-7TB Prepared from 4-tert-butylphenol. Yield 88% (after vacuum distillation at 141–145° C. at 0.20–0.25 mmHg) as a colorless oil. The product has the following characteristics. $^1$H NMR (400.13 MHz, $CDCl_3$): 1.31 (s, 9H, $(CH_3)_3C$—), 2.62 (br s, 1H, OH), 3.78 (m, 2H, $ArOCH_2CH$), 3.93 (t of t, $J_{HF}$=12.6, 1.6 Hz, 2H, —$CH_2OCH_2CF_2CF_2H$), 4.02 (m, 2H, —$CH_2OCH_2CF_2CF_2H$), 4.18 (m, 1H, $ArOCH_2CH$), 5.92 (t of t, $J_{HF}$=53, 4.8 Hz, 1H, —$CH_2OCH_2CF_2CF_2H$), 6.86 (d, J=8.7 Hz, 2H, ArH2, ArH6), 7.32 (d, J=8.7 Hz, 2H, ArH3, ArH5); $^{13}C\{^1H\}$ (100.61 MHz, $CDCl_3$): 31.4 $((CH_3)_3C$—), 34.0 $((CH_3)_3C$—), 68.4 (t, $J_{CF}$=28 Hz, —$CH_2OCH_2CF_2CF_2H$), 68.6 (—$CH_2OCH_2CF_2CF_2H$), 69.1 ($ArOCH_2CH$), 73.4 ($ArOCH_2CH$), 109.2 (t of t, JCF= 249, 35 Hz, —$CH_2OCH_2CF_2CF_2H$), 114.0 (ArC2, ArC6), 114.9 (t of t, $J_{CF}$=249, 28 Hz, —$CH_2OCH_2CF_2CF_2H$), 126.3 (ArC3, ArC5), 144.1 (ArC4), 156.1 (ArC1).

The product contains 1% 4-tert-butyl anisole (which is inert as a modifier) from the methylation of the residual phenol.

Example 3
1-(2,2,3,3-Tetrafluoropropoxy)-3-(4-sec-butylphenoxy)-2-propanol, Cs-7SBT/Cs-7SB The designation SBT refers to technical grade 4-sec-butylphenol, and SB refers to reagent grade 4-sec-butylphenol. For Cs-7SBT from technical grade 4-sec-butylphenol, the yield is 91% (after vacuum distillation at 152–156° C. at 0.25–0.28 mmHg) as a colorless oil. The product has the following characteristics. $^1$H NMR (400.13 MHz, $CDCl_3$): d 0.80 (t, J=7.2 Hz, 3H, $(CH_3CH_2CH(CH_3)$—), 1.20 (d, J=6.9 Hz, 3H, $(CH_3CH_2CH(CH_3)$—), 1.55 (m, 2H, $(CH_3CH_2CH(CH_3)$—), 2.53 (m, 1H, $(CH_3CH_2CH(CH_3)$—), 2.94 (d, J=6Hz, 1H, OH), 3.73 (m, 2H, $ArOCH_2CH$), 3.89 (t of t, $J_{HF}$=12.6, 1.6 Hz, 2H, —$CH_2OCH_2CF_2CF_2H$), 3.98 (m, 2H, —$CH_2OCH_2CF_2CF_2H$), 4.14 (m, 1H, $ArOCH_2CH$), 5.90 (t of t, $J_{HF}$=53, 4.7 Hz, 1H, —$CH_2OCH_2CF_2CF_2H$), 6.82 (d, J=8.5 Hz, 2H, ArH2, ArH6), 7.09 (d, J=8.5 Hz, 2H, ArH3, ArH5); $^{13}C\{^1H\}$ (100.61 MHz, $CDCl_3$): d 12.2 $(CH_3CH_2CH(CH_3)$—), 21.9 $(CH_3CH_2CH(CH_3)$—), 31.3 $(CH_3CH_2CH(CH_3)$—), 40.8 $(CH_3CH_2CH(CH_3)$—), 68.4 (t, $J_{CF}$=27.9 Hz, —CH$_2$OCH$_2$CF$_2$CF$_2$H), 68.6 (—CH$_2$OCH$_2$CF$_2$CF$_2$H), 69.1 (ArOCH$_2$CH), 73.4 (ArOCH$_2$CH), 109.2 (t of t, $J_{CF}$=250, 35 Hz, —CH$_2$OCH$_2$CF$_2$CF$_2$H), 114.3 (ArC2, ArC6), 114.9 (t of t, $J_{CF}$=250, 27 Hz, —CH$_2$OCH$_2$CF$_2$CF$_2$H), 127.9 (ArC3, ArC5), 140.5 (ArC4), 156.4 (ArC1). The product from the use of technical grade 4-sec-butylphenol contains about 94% of the 4-sec-butyl isomer, about 5% of other isomers (that were present in the starting phenol), and 1% 4-sec-butyl anisole (which is inert as a modifier) from the methylation of the residual phenol.

Example 4
1-(2,2,3,3-Tetrafluoropropoxy)-3-(4-tert-amylphenoxy)-2-propanol, Cs-7TA Prepared from 4-tert-amylphenol. Yield 92% (after vacuum distillation at 160–163° C. at 0.25–0.28 mmHg) as a straw-colored oil. The product has the following characteristics. $^1$H NMR (400.13 MHz, CDCl$_3$): d 0.67 (t, 3H, J=7.5 Hz, (CH$_3$CH$_2$C(CH$_3$)$_2$—), 1.25 (s, 6H, (CH$_3$CH$_2$C(CH$_3$)$_2$—), 1.60 (q, 2H, 7.5 Hz, (CH$_3$CH$_2$C(CH$_3$)$_2$—), 2.72 (d, J=4.5 Hz, 1H, OH), 3.75 (m, 2H, ArOCH$_2$CH), 3.91 (t of t, $J_{HF}$=12.6, 1.6 Hz, 2H, —CH$_2$OCH$_2$CF$_2$CF$_2$H), 4.00 (m, 2H, —CH$_2$OCH$_2$CF$_2$CF$_2$H), 4.16 (m, 1H, ArOCH$_2$CH), 5.90 (t of t, $J_{HF}$=53, 4.8 Hz, 1H, —CH$_2$OCH$_2$CF$_2$CF$_2$H), 6.84 (d, J=8.7 Hz, 2H, ArH2, ArH6), 7.23 (d, J=8.7 Hz, 2H, ArH3, ArH5); $^{13}$C{$^1$H} (100.61 MHz, CDCl$_3$): d 9.04 (CH$_3$CH$_2$C(CH$_3$)$_2$—), 28.5 (CH$_3$CH$_2$C(CH$_3$)$_2$—), 36.9 (CH$_3$CH$_2$C(CH$_3$)$_2$—), 37.3 (CH$_3$CH$_2$C(CH$_3$)$_2$—), 68.4 (t, $J_{CF}$=28 Hz, —CH$_2$OCH$_2$CF$_2$CF$_2$H), 68.5 (—CH$_2$OCH$_2$CF$_2$CF$_2$H), 69.1 (ArOCH$_2$CH), 73.4 (ArOCH$_2$CH), 109.2 (t of t, $J_{CF}$=249, 35 Hz, —CH$_2$OCH$_2$CF$_2$CF$_2$H), 113.9 (ArC2, ArC6), 114.9 (t of t, $J_{CF}$=249, 28 Hz, —CH$_2$OCH$_2$CF$_2$CF$_2$H), 126.7 (ArC3, ArC5), 142.3 (ArC4), 156.0 (ArC1). The product contains 1% 4-tert-amyl anisole (which is inert as a modifier) from the methylation of the residual phenol.

Example 5
Large-scale Synthesis of 1-(2,2,3,3-Tetrafluoropropoxy)-3-(4-sec-butylphenoxy)-2-propanol, Cs-7SB.

A jacketed 10-L reactor kettle equipped with an overhead paddle stirrer, condenser, argon inlet, 1-L pressure-equalizing addition funnel, and thermocouple thermometer was charged with 3.8 liters of 95% ethanol. The ethanol was sparged with argon for about 10 min using a Pyrex tube connected to the argon inlet. A heating and cooling circulator bath was used to pump fluid (propylene glycol/water mixture) through the jacket to heat or cool the reactor. The temperature inside the reactor was monitored and controlled using the thermocouple thermometer inserted into the solution; the thermocouple was connected to the temperature controller of the circulating bath. Under argon, 4-sec-butylphenol (1367 g, 9.1 mol), was added to the ethanol in the kettle with stirring. An additional one liter of 95% ethanol was added, followed by dry ground potassium carbonate (130 g, 0.94 mol). The slurry was sparged with argon for an additional 30 minutes, and the circulating bath temperature increased to give a solution temperature inside the reactor of 56° C. The argon inlet was removed and replaced with a ground glass stopper. When the solution temperature had reached 53° C., the 1-L addition funnel was charged with the first portion (900.8 g) of epoxide to be added (total of 1787 g, ~1350 mL, 9.5 mol). The epoxide was then added to the stirred solution (at 54° C.), over the course of 23 min at an average rate of 28–30 mL/min (target rate is 2 mol % epoxide/min or ~26 mL/min). The solution temperature at the end of the addition of the first portion, of the epoxide was 56° C. The temperature was now raised to 60° C., the remaining epoxide was charged to the funnel and added to the reaction mixture over the course of 30 min at an average rate of 20–22 mL/min. The temperature at the end of the addition was 59° C. The bottles containing the epoxide were each rinsed with 250 mL of 95% ethanol, and these rinsings used to rinse the epoxide residue in the addition funnel into the reaction mixture. The reaction solution volume was now about 8.5 L at 57–59° C. The circulating bath was then set to give a reactor solution temperature of 80° C., and in about an hour, the solution temperature had reached 80° C., and the solution was refluxing gently. The stirred solution was refluxed for 14 hours, at which time a sample of the amber-colored reaction mixture was spotted on a silica TLC plate (80:20 hexanes/ethylacetate). The TLC showed the product (Rf 0.40) and that all the detectable starting phenol (Rf 0.55) had been consumed and that the reaction was complete.

The circulating bath was then set to give a reactor solution temperature of 35° C. to cool the reaction mixture. When the solution had reached that temperature, a valve at the bottom of the kettle was opened and the ~8 L of solution was drained into three 4-L heavy-walled Erlenmeyer flasks, along with about 300 mL of 95% ethanol used to rinse the reactor. The solution was filtered to remove insoluble potassium carbonate, and the precipitates washed with 95% ethanol and added to the filtrate. The ethanol was removed by rotary evaporation (40–50° C.; 140–160 mbar) to afford about 3.2 kg of raw Cs-7SB modifier as a dark amber-colored oil. The modifier was diluted with 7.2 L of hexanes, and washed twice with 4.5-L portions of 5% NaOH, twice with 4.5-L portions of distilled water, and once with 4.5 L of saturated sodium bicarbonate. The hexane solutions were dried with anhydrous magnesium sulfate, filtered, and the hexanes removed from the straw-colored solution by rotary evaporation to afford 3244 g of light amber oil. Proton NMR and gas chromatographic analysis on the crude product indicated a purity of 94.5% of the main structural isomer, 1.46% of the minor structural isomer 2-(4-sec-butylphenoxy)-3-(2,2,3,3-tetrafluoropropoxy)-1-propanol, and about 0.028% unreacted 4-sec-butylphenol. The low amount of unreacted phenol made the methylation step unnecessary. The remaining sideproducts included 1.4% 1-(2,2,3,3-tetrafluoropropoxy)-3-ethoxy-2-propanol, and a few percent total of various polymeric materials. Final purification was achieved by fractional distillation (140–148° C. at 0.25–0.28 mmHg) to give 2959 g of Cs-7SB modifier (96.1% yield on starting phenol). Proton NMR and gas chromatographic analysis on the distilled product indicated a purity of 97.5% of the main structural isomer, and 1.34% of the minor structural isomer, no 4-sec-butylphenol was detected. The remaining sideproducts included 0.65% 1-(2,2,3,3-tetrafluoropropoxy)-3-ethoxy-2-propanol, and less than 0.5% total of various polymeric materials. The product has the following characteristics. $^1$H NMR (CDCl$_3$): 0.82 (t, J=7.2 Hz, 3H, (CH$_3$CH$_2$CH(CH$_3$)—), 1.21 (d, J=6.9 Hz, 3H, (CH$_3$CH$_2$CH(CH$_3$)—), 1.57 (m, 2H, (CH$_3$CH$_2$CH(CH$_3$)—), 2.55 (m, 1H, (CH$_3$CH$_2$CH(CH$_3$)—), 2.7 (broad singlet, J=6 Hz, 1H, OH), 3.76 (m, 2H, ArOCH$_2$CH), 3.92 (t of t, $J_{HF}$=12.6, 1.6 Hz, 2H, —CH$_2$OCH$_2$CF$_2$CF$_2$H), 4.01 (m, 2H, —CH$_2$OCH$_2$CF$_2$CF$_2$H), 4.17 (m, 1H, ArOCH$_2$CH), 5.92 (t of t, $J_{HF}$=53, 4.7 Hz, 1H, —CH$_2$OCH$_2$CF$_2$CF$_2$H), 6.82 (d, J=8.5 Hz, 2H, ArH2, ArH6), 7.09 (d, J=8.5 Hz, 2H, ArH3, ArH5); $^{13}$C{$^1$H} (CDCl$_3$): 12.2 (CH$_3$CH$_2$CH(CH$_3$)—), 21.9 (CH$_3$CH$_2$CH(CH$_3$)—), 31.3 (CH$_3$CH$_2$CH(CH$_3$)—), 40.8 (CH$_3$CH$_2$CH(CH$_3$)—), 68.4 (t, $J_{CF}$=27.9 Hz, —CH$_2$OCH$_2$CF$_2$CF$_2$H), 68.6 (—CH$_2$OCH$_2$CF$_2$CF$_2$H), 69.1 (ArOCH$_2$CH), 73.4 ArOCH$_2$CH), 109.2 (t of t, $J_{CF}$=250, 35 Hz, —CH$_2$OCH$_2$CF$_2$CF$_2$H), 114.3 (ArC2, ArC6), 114.9 (t of t, $J_{CF}$=250, 27 Hz, —CH$_2$OCH$_2$CF$_2$CF$_2$H), 127.9 (ArC3, ArC5), 140.5 (ArC4), 156.4 (ArC1); $^{19}$F NMR (CDCl$_3$): -123.9 (m, —CH$_2$OCH$_2$CF$_2$CF$_2$H), -138.3 (d, $J_{HF}$=53 Hz, —CH$_2$OCH$_2$CF$_2$CF$_2$H). The $^{19}$F NMR resonances for the minor isomer 2-(4-sec-butylphenoxy)-3-(2,2, 3,3-tetrafluoropropoxy)-1-propanol are −124.3 (m, —CH$_2$OCH$_2$CF$_2$CF$_2$H), −138.7 (d, J$_{HF}$=53 Hz, —CH$_2$OCH$_2$CF$_2$CF$_2$H).

Example 6

In a similar manner to the previous examples, a generic phenol of the type shown in Formula (III) can be reacted with a glycidyl fluoroalkyl ether of the type shown in Formula (IV) under base-catalyzed conditions in a wet alcohol solvent such as 95% ethanol to afford phenoxy fluoro-alcohols complying with Formula Example 7

Alkaline-stability of Modifiers Cs-6 and Cs-7SBT Relative to Cs-3.

To evaluate the chemical stability of the new modifiers, solvents containing them were prepared and the cesium distribution ratios recorded upon contact of these solvents with an alkaline simulant of Savannah River nuclear waste as a function of exposure time of the solvent with the simulant at 52±1 C. The composition of the waste simulant is shown in Table 1. Solvents were prepared by dissolving the respective modifier (Cs-3, Cs-6, and Cs-7SBT) in the aliphatic kerosene diluent Isopar® L (ExxonMobil) at a concentration of 0.50 molar. The solvent additionally contained the cesium extractant calix[4]arene-bis-(tert-octyl benzo-crown-6) ether (BoBCalix[4]Crown6) at a concentration of 0.01 molar. The solvent containing the Cs-7SBT modifier additionally contained a small amount of tri-n-octylamine at a concentration of 0.001 molar, which improves the stripping efficiency and does not affect the stability of the modifier.

Aliquots of each solvent were placed in Teflon® FEP centrifuge tubes with an equal volume of the waste simulant with or without $^{137}$Cs tracer, and the tubes rotated end-over-end using a Glas-Col® rugged rotator placed inside a Lab-line model Imperial III incubator maintained at 52±1° C. At various times, the tubes containing the tracer were removed, allowed to cool to 25° C. with rotation for 2 hours, and the solvent and simulant phases sampled for $^{137}$Cs activity. The cesium distribution ratio D$_{Cs}$ at 25° C. was then determined in the usual manner by taking the ratio of the cesium activity in the organic (solvent) phase to the cesium activity in aqueous (simulant) phase. The initial cesium distribution ratio, or zero time-point, was obtained following a 2-hour contact at 25° C. (no contacting performed at 52° C.). In parallel, the tubes containing no activity were removed at the same time intervals as the samples containing the cesium tracer, and aliquots of the organic phase removed directly for NMR and GC/MS analyses.

Figure 13:
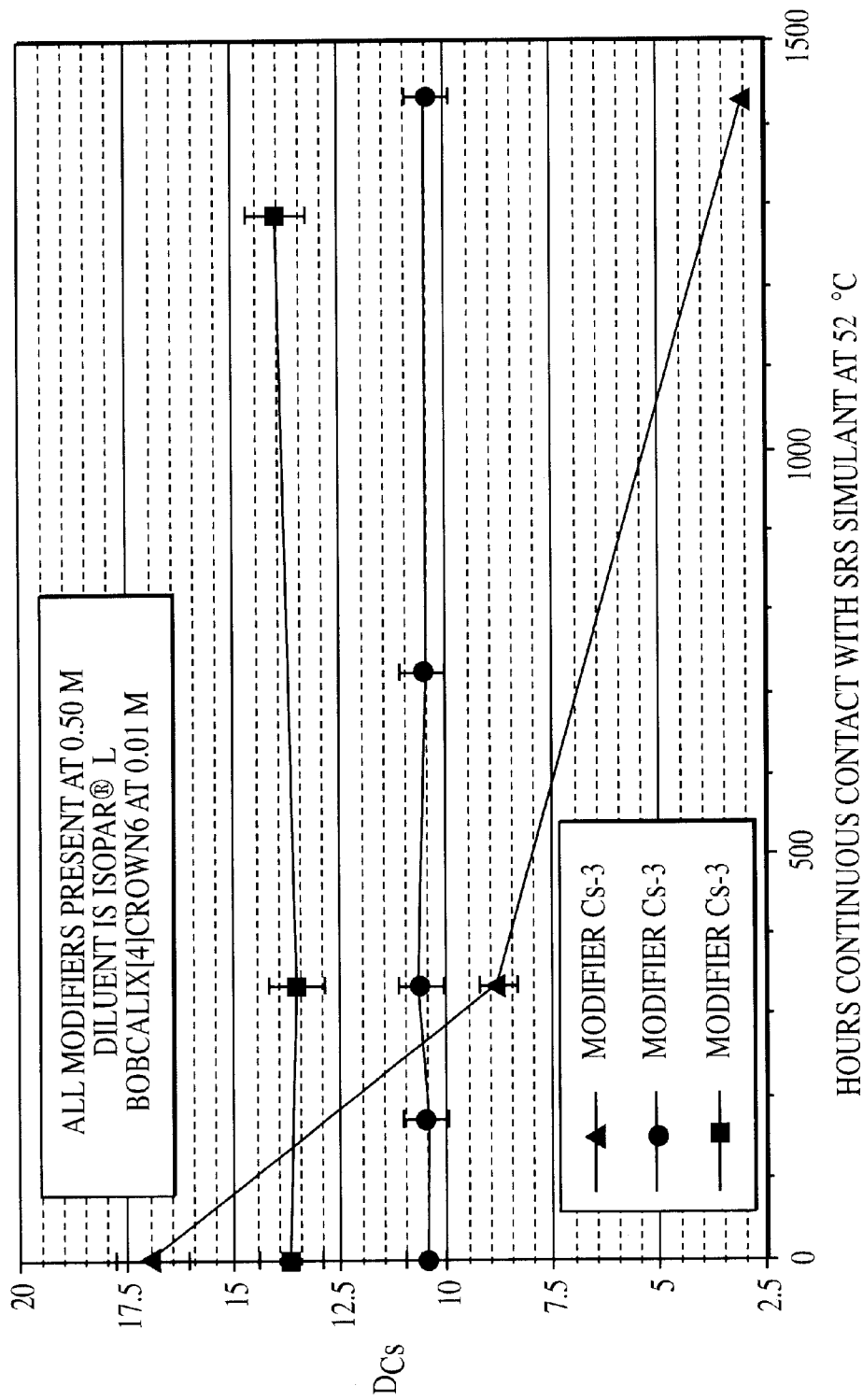
FIG. 13 is a graph comparing cesium distribution ratios ($D_{Cs}$, recorded at 25° C.) for solvents containing modifiers Cs-3 (Formula (I)), and Cs-6, and Cs-7SBT (as shown in FIG. 12) all at 0.50 molar (with calixarene-crown ether BoBCalix[4]Crown6-ether at 0.01 molar) as a function of exposure time to Savannah River alkaline waste simulant (Table 1) at 52±1° C. Error bars represent ±5% uncertainty in $D_{Cs}$.

As is shown in FIG. 13, the solvent containing modifier 1-(1,1,2,2-tetrafluoroethoxy)-3-(4-tert-octylphenoxy)-2-propanol (Cs-3) exhibited a noticeable drop in the cesium distribution ratio after just two weeks. Proton NMR analysis of non-radioactive samples of the solvent revealed that the Cs-3 modifier was being converted into a new molecule that possessed one tetrafluoroethoxy moiety per two tert-octylphenyl groups. Fluorine-19 NMR also confirmed that a new molecule containing the tetrafluorethoxy moiety was being formed. The NMR revealed that 65–70% of the Cs-3 had been converted to the new material after 1440 hours contact time. The solvent was further analyzed by gas chromatography-mass spectral analysis (GC/MS) which identified the new material as having a mass of 642 g/mol, consistent with the molecule shown in FIG. 10 which is formed from the condensation of two molecules of Cs-3 with concomitant loss of a single tetrafluoroethoxy moiety. The bulky condensation product is apparently ineffective as a modifier, since the cesium extraction strength observed seems to be a function of only the concentration of the (remaining) Cs-3 modifier. In fact, adding an amount of fresh Cs-3 modifier proportional to the amount lost back to the degraded solvent restores the solvent to nearly the same performance level with respect to extraction strength (as previously described in Report ORNL/TM-13704). However, the stripping performance is somewhat compromised as the stripping cesium distribution ratios are elevated relative to that of pristine solvent. In summary, the Cs-3 modified solvent degrades in performance with increasing exposure time to the simulant.

Though the precise mechanism by which the condensation product is formed is still being investigated, it is nonetheless apparent that the strongly electron-withdrawing nature of the —OCF$_2$CF$_2$—H moiety makes the carbon to which it is attached quite electropositive and accordingly subject to nucleophilic attack. In addition, the electron-withdrawing effect of the fluorine atoms in proximity to the oxygen atom results in the oxygen atom having a substantial amount of positive character. This in effect weakens the C—O bond strength in C—OCF$_2$CF$_2$—H to the extent that bond scission can occur. The fate of the —OCF$_2$CF$_2$—H moiety following elimination appears to be that it transfers to the aqueous alkaline phase where it is converted to two equivalents of fluoride ion and one equivalent of [M$^+$][-OC(O)CF$_2$—H]. (It is known that the —OCF$_2$CF$_2$—H radical is highly unstable as described in O. J. Nielsen, T. Ellermann, J. Schested, and T. J. Wallington, J. Phys. Chem., 1992, 96, 10875–10879, hereby incorporated by reference, and it is therefore not unreasonable that the —OCF$_2$CF$_2$—H moiety is converted in the alkaline simulant phase to free fluoride ion and difluoroacetate.) To make the modifier less sensitive to this method of degradation, it was reasoned that replacing the —OCF$_2$(CF$_2$)$_n$—H moiety with a —OCH$_2$(CF$_2$)$_n$—H moiety might not only make the carbon to which the oxygen is attached less electropositive, and hence less subject to nucleophilic attack, but perhaps more importantly decrease the positive character of the oxygen so that the C—O bond strength is increased. It should be noted that the alcohols of type HOCH$_2$(CF$_2$)$_n$—H are stable, whereas alcohols of the type HOCF$_2$(CF$_2$)$_n$—H are not.

The comparative chemical stability of solvents containing modifier Cs-3 versus selected new modifiers of this invention is also shown in FIG. 13. Two new modifiers containing the —OCH$_2$(CF$_2$)_H moiety where n=2, 1-(2,2,3,3-tetrafluoropropoxy)-3-(4-tert-octylphenoxy)-2-propanol (Cs-6), and 1-(2,2,3,3-tetrafluoropropoxy)-3-(4-sec-butylphenoxy)-2-propanol (Cs-7SBT), were examined under the same set of conditions as was the Cs-3 modifier. The results show that the cesium distribution ratio is stable and does not erode with exposure time to the simulant at 52±1° C. Furthermore, NMR analysis revealed the new modifiers to be stable with no ingrowth of decomposition products being observed. Though this result can be explained by the arguments provided above, the significant increase in stability to warm alkali demonstrated simply by insertion of a methylene (—CH$_2$) group between the oxygen and the —CF$_2$ group was somewhat unexpected.

Example 8

Use of the New Modifiers in a Solvent Extraction Process

The use of the new modifiers of this invention in a process solvent demonstrating cesium extraction, scrubbing, and stripping performance was investigated. Three solvents were evaluated. All solvents contained the cesium extractant BoBCalix[4]Crown6 at a concentration of 0.01 molar and tri-n-octyl amine at a concentration of 0.001 molar. The tri-n-octyl amine (or any tertiary amine of formula (C$_n$H$_{2n+1}$)$_3$N in which n=6 to 12) serves the purpose of improving the stripping efficiency. In principle, suitably lipophilic primary or secondary aliphatic amines (including secondary cyclic amines), and even N-heterocyclic aromatic amines (such as alkyl pyridines) could also be employed. The stripping performance of earlier embodiments of the solvent which did not contain said tertiary amine were found to be sensitive to the presence of lipophilic anion impurities in the feed [P. V. Bonnesen, L. H. Delmau, B. A. Moyer, and R. A Leonard "A Robust Alkaline-Side CSEX Solvent Suitable for Removing Cesium from Savannah River High Level Waste," *Solvent Extr. Ion Exch*, 2000, 18(6), 1079–1108; Report ORNL/TM-13704; P. V. Bonnesen, T. J. Haverlock, N. L. Engle, R. A. Sachleben, and B. A. Moyer, in *Calixarene Molecules for Separations*, G. J. Lumetta and R. D. Rogers, Eds., ACS Symposium Series 757, American Chemical Society, Washington, D.C., 2000; Chapter 3. , hereby incorporated in their entirety by reference.] Such impurities include common anionic surfactants such as dodecylsulfonate [L. H. Delmau, G. J. Van Berkel, P. V. Bonnesen, and B. A. Moyer, Improved Performance of the Alkaline-Side CSEX Process for Cesium Extraction from Alkaline High-Level Waste Obtained by Characterization of the Effect of Surfactant Impurities, Report ORNL/TM-1999/209, Oak Ridge National Laboratory: Oak Ridge, Tenn., 1999, hereby incorporated by reference], which make back-extraction less efficient. This back-extraction problem is expected to be general to the class of ion-pair extractions of mineral-acid salts by neutral crown ethers. The solvent can be made tolerant of such impurities by the addition of a suitable lipophilic base such as tri-n-octylamine in low concentrations to the solvent. The addition of tri-n-octylamine is also believed to suppress the weak dissociation of nitrate from the organic-phase cesium complex [Report ORNL/TM-13704]. This effect increases in relative importance as the organic-phase cesium concentration decreases upon successive stripping contacts. The addition of tri-n-octylamine (or any tertiary amine of formula $(C_nH_{2n+1})_3N$ in which n=6 to 12) thus allows effective stripping to be accomplished using dilute nitric acid solutions alone, without the inclusion of dilute (stable) cesium nitrate [U.S. patent application Ser. No. 09/146,80, filed Sep. 3, 1998, Report ORNL/TM-13704. The first solvent contained, in addition to BoBCalix[4]Crown6 at a concentration of 0.01 molar and tri-n-octyl amine at a concentration of 0.001 molar, the modifier 1-(2,2,3,3-tetrafluoropropoxy)-3-(4-tert-octylphenoxy)-2-propanol (Cs-6) at 0.50 molar in the diluent Norpar® 12 (ExxonMobil). The second solvent contained, in addition to BoBCalix[4]Crown6 at a concentration of 0.01 M and tri-n-octyl amine at a concentration of 0.001 molar, the modifier 1-(2,2,3,3-tetrafluoropropoxy)-3-(4-tert-amylphenoxy)-2-propanol (Cs-7TA) at 0.50 molar in the diluent Isopar® L (ExxonMobil). The third solvent contained, in addition to BoBCalix[4]Crown6 at a concentration of 0.01 molar and tri-n-octyl amine at a concentration of 0.001 molar, the modifier 1-(2,2,3,3-tetrafluoropropoxy)-3-(4-sec-butylphenoxy)-2-propanol (Cs-7SBT) at 0.50 molar in the diluent Isopar® L (ExxonMobil).

The solvents were each contacted twice successively with the simulant described in Table 1, which contained radioactive cesium-137 at trace concentrations sufficient for monitoring the partitioning of cesium-137 between the aqueous and organic phases using radiometric methods. The phase volume ratio of the solvent to the simulant was 0.5. Contacting was by end-over-end rotation using a Glas-Col® rotator as described in EXAMPLE 7 for 30 minutes at 25° C. The solvent from the first extraction contact was contacting with fresh simulant for the second extraction contact. An aliquot of the solvent from the second extraction contact was then contacted for 30 min at 25° C. twice successively with fresh 0.050 molar nitric acid (scrubbing solution) at an organic-to-aqueous (O/A) phase volume ratio of 5.0. An aliquot of the solvent from the second scrubbing contact was then contacted for 30 min at 25° C. five times successively with fresh 0.001 molar nitric acid (stripping solution) at an O/A phase volume ratio of 3.0 (except for the Cs-6 containing solvent which was stripped only three times). After each contact, small aliquots of each phase were removed and the cesium-137 activity determined by gamma counting the barium-137 m daughter using standard gamma radiometric counting methods, and the cesium distribution ratio between the organic and aqueous phases was determined. The results are shown in Table 2 for the three solvents, demonstrating an effective solvent extraction process for extracting cesium from an alkaline solution and for decontaminating the solvent for recycle by scrubbing and stripping operations.

TABLE 2

Cesium extraction, scrubbing, and stripping performance for solvents containing three of the new modifiers.

| | O/A Volume ratio | Cs-6 (Norpar ® 12) | Cs-7-TA (Isopar ® L) | Cs-7-SBT (Isopar ® L) |
|---|---|---|---|---|
| 1st extraction | 0.5 | 9.33 | 12.36 | 12.64 |
| 2nd extraction | 0.5 | 8.19 | 10.42 | 10.70 |
| 1st scrub | 5.0 | 0.77 | 1.13 | 1.18 |
| 2nd scrub | 5.0 | 0.89 | 1.13 | 1.28 |
| 1st strip | 3.0 | 0.11 | 0.16 | 0.17 |
| 2nd strip | 3.0 | 0.062 | 0.091 | 0.099 |
| 3rd strip | 3.0 | 0.039 | 0.058 | 0.063 |
| 4th strip | 3.0 | not performed | 0.046 | 0.050 |
| 5th strip | 3.0 | not performed | 0.046 | 0.049 |

In addition to what is described above, an appropriately formulated embodiment of the present invention, potentially including additional extractants and modifiers, can be used for the combined extraction of technetium (pertechnetate anion) and strontium, as well as cesium from alkaline waste.

Accordingly, it is seen that the present invention provides a composition and process for the separation of cesium from alkaline waste solutions including those which contain large excesses of other alkali metal ions such as sodium and potassium. The present invention further provides a practical alkaline-side cesium extraction process as well as an improved composition and method for extracting cesium from acidic solutions. Additionally, it provides a method and composition for extracting cesium from hydrometallurgical solutions. Moreover, it provides the basis for a composition and process for the clean up of cesium and other metals such as technetium and strontium from nuclear waste sites. It will be understood that various details of the invention may be changed without departing from the scope of the invention. Furthermore, the forgoing section description is for the purpose of illustration only, and not for the purpose of limitation, since the invention is limited by the claims.

What is claimed is:

1. Phenoxy fluoro-alcohol of Formula:

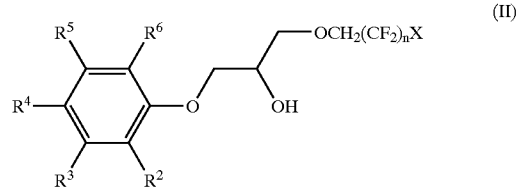

wherein n=2 to 4,

X=a hydrogen atom or a fluorine atom, $R^2$ and $R^6$ are each independently a hydrogen atom or $C_1$ alkyl, $R^4$ is a hydrogen atom or $C_1$–$C_{12}$ alkyl when $R^3$ and $R^5$ are each independently selected from a hydrogen atom or $C_1$–$C_2$ alkyl;

and $R^3$ and $R^5$ are the same or different and each is hydrogen or $C_3$–$C_{12}$ alkyl when $R^4$ is a hydrogen atom or $C_1$ alkyl.

2. The phenoxy alcohol according to Formula (II) of claim 1 in which n=2, X=a hydrogen atom, $R^2$, $R^3$, $R^5$, and $R^6$ are all hydrogen atoms, and $R^4$ is a $C_1$–$C_{12}$ straight-chain or branched alkyl group.

3. The phenoxy fluoro-alcohol according to claim 2 in which $R^4$ is selected from the group consisting of n-propyl, isopropyl, $CH_3CH_2CH_2CH_2$-(n-butyl), $CH_3CH_2(CH_3)CH$-(sec-butyl), $(CH_3)_2CHCH_2$-(iso-butyl), $(CH_3)_3C$-(tert-butyl), $CH_3CH_2CH_2CH_2CH_2$-(n-pentyl), $(CH_3)_2CHCH_2CH_2$-(isoamyl), $(CH_3)_3CCH_2$-(neopentyl), $CH_3CH_2C(CH_3)_2$-(tert-amyl), $CH_3CH_2CH_2CH_2CH_2CH_2$-(n-hexyl), $CH_3CH_2CH_2CH_2CH(CH_2CH_3)CH_2$-(2-ethylhexyl), $(CH_3)_3C-CH_2-C(CH_3)_2$-(tert-octyl), and $CH_3CH_2CH_2CH_2CH_2CH_2CH_2CH_2$-(n-octyl).

4. The phenoxy fluoro-alcohol according to claim 3 in which $R^4$ is $CH_3CH_2(CH_3)CH$-(sec-butyl).

5. The process for the preparation of a phenoxy fluoro-alcohol according to Formula (II) of claim 1 comprising the steps of:

a) reacting a phenol of Formula (III):

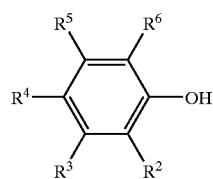

(III)

wherein $R^2$ and $R^6$ are each independently a hydrogen atom or $C_1$ alkyl, $R^4$ is a hydrogen atom or $C_1$–$C_{12}$ alkyl when $R^3$ and $R^5$ are each independently selected from a hydrogen atom or $C_1$–$C_2$ alkyl, and $R^3$ and $R^5$ are the same or different and each is hydrogen or $C_3$–$C_{12}$ alkyl when $R^4$ is a hydrogen atom or $C_1$ alkyl, with a glycidyl fluoroalkyl ether of Formula (IV):

(IV)

wherein n=2 to 4 and X=a hydrogen atom or a fluorine atom; and b) separating the phenoxy fluoro-alcohol obtained from the reaction mixture.

6. The process according to claim 5 for the preparation of a phenoxy fluoro-alcohol according to Formula (II) of claim 1 comprising the steps of a) reacting a phenol of Formula (III):

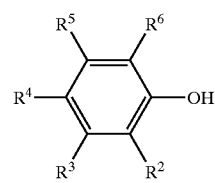

(III)

wherein $R^2$, $R^3$, $R^5$, and $R^6$ are all hydrogen atoms, and $R^4$ is a $C_1$–$C_{12}$ straight-chain or branched alkyl group, with glycidyl fluoroalkyl ether of Formula (IV):

(IV)

in which n=2 and X is a hydrogen atom; and b) separating the phenoxy fluoro-alcohol obtained from the reaction mixture.

7. The process of claim 6 in which $R^4$ of the phenol according to Formula (III) is selected from the group consisting of n-propyl, isopropyl, $CH_3CH_2CH_2CH_2$-(n-butyl), $CH_3CH_2(CH_3)CH$-(sec-butyl), $(CH_3)_2CHCH_2$-(iso-butyl), $(CH_3)_3C$-(tert-butyl), $CH_3CH_2CH_2CH_2CH_2$-(n-pentyl), $(CH_3)_2CHCH_2CH_2$-(isoamyl), $(CH_3)_3CCH_2$-(neopentyl), $CH_3CH_2C(CH_3)_2$-(tert-amyl), $CH_3CH_2CH_2CH_2CH_2CH_2$-(n-hexyl), $CH_3CH_2CH_2CH_2CH(CH_2CH_3)CH_2$-(2-ethylhexyl), $(CH_3)_3C-CH_2-C(CH_3)_2$-(tert-octyl), and $CH_3CH_2CH_2CH_2CH_2CH_2CH_2CH_2$-(n-octyl).

8. A composition for extracting cesium from alkaline solutions comprising:

a) a phenoxy fluoro-alcohol of Formula (II) according to claim 1, b) an alkane-soluble calixarene-crown ether of Formula (V):

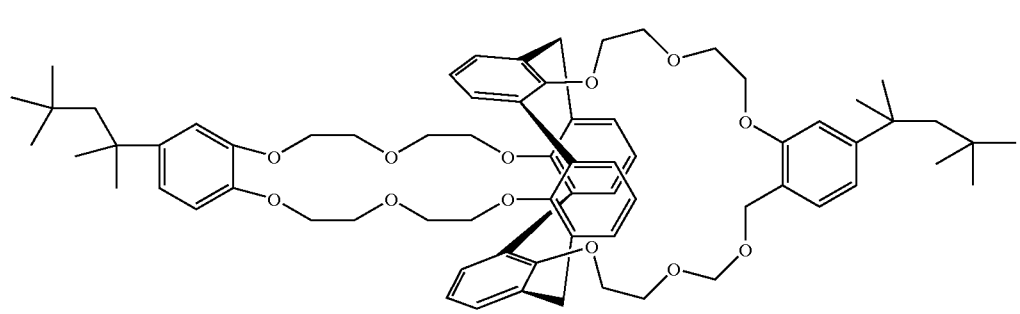

(V)

c) a water-immiscible hydrocarbon diluent; and d) a tertiary amine of formula $(C_nH_{2}n+1)3N$ in which n=6 to 12.

9. The composition according to claim 8 wherein said phenoxy fluoro-alcohol is 1-(2,2,3,3-tetrafluoropropoxy)-3-(4-sec-butylphenoxy)-2-propanol.

10. A process for extracting cesium and other metals from alkaline waste solutions comprising the steps of:

contacting a volume of an aqueous feed solution containing cesium and other metal ions with a solvent comprising:
a) an alkane-soluble calixarene-crown ether of Formula (V) according to claim 8,
b) a water-immiscible hydrocarbon diluent,
c) a phenoxy fluoro-alcohol of Formula (II) according to claim 1; and
d) a tertiary amine of formula $(C_nH_2n+1)_3N$ in which n=6 to 12, contacting a volume of the solvent obtained above containing the portion of cesium, with a volume of a scrubbing solution, comprised of dilute mineral acid having between 30 and 200 millimolar concentration, thereby removing substantially all the other metal ions while retaining in the solvent a substantial portion of the cesium values; contacting a volume of the solvent obtained after scrubbing above with a volume of a stripping solution, comprised of pure water, dilute salt, or dilute mineral acid having up to 10 millimolar concentration; thereby removing the cesium values from the solvent phase into the stripping solution to make the organic solution containing the calixarene-crown ether, the phenoxy fluoro-alcohol, and the tertiary amine available for reuse.

11. Phenoxy fluoro-alcohol of Formula:

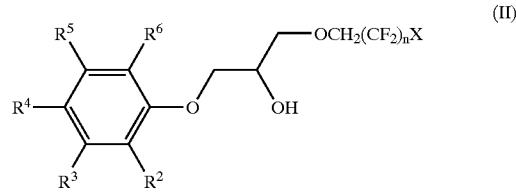

(II)

wherein n=1,

X=a hydrogen atom, $R^2$ and $R^6$ are each independently a hydrogen atom or $C_1$ alkyl, $R^4$ is a hydrogen atom or $C_1$–$C_{12}$ alkyl when $R^3$ and $R^5$ are each independently selected from a hydrogen atom or $C_1$–$C_2$ alkyl; and $R^3$ and $R^5$ are the same or different and each is hydrogen or $C_3$–$C_{12}$ alkyl when $R^4$ is a hydrogen atom or $C_1$ alkyl.

\* \* \* \* \*